US009384671B2

(12) United States Patent
Krosky et al.

(10) Patent No.: US 9,384,671 B2
(45) Date of Patent: Jul. 5, 2016

(54) INSTRUCTION PRODUCTION

(71) Applicants: Ronald Charles Krosky, Cockeysville, MD (US); Brendan Edward Clark, Rocky River, OH (US)

(72) Inventors: Ronald Charles Krosky, Cockeysville, MD (US); Brendan Edward Clark, Rocky River, OH (US)

(*) Notice: Subject to any disclaimer, the term of this patent is extended or adjusted under 35 U.S.C. 154(b) by 141 days.

(21) Appl. No.: 13/769,385

(22) Filed: Feb. 17, 2013

(65) Prior Publication Data

US 2014/0234814 A1 Aug. 21, 2014

(51) Int. Cl.
*G09B 19/00* (2006.01)
*G09B 5/02* (2006.01)

(52) U.S. Cl.
CPC .................................. *G09B 5/02* (2013.01)

(58) Field of Classification Search
CPC ............... A63B 24/0003; A63B 2024/0012; A63B 69/36; A63B 24/0006; A63B 24/0075; A63B 69/0071; G09B 19/00
USPC .......................................... 434/247, 252, 262
See application file for complete search history.

(56) References Cited

U.S. PATENT DOCUMENTS

| 5,697,791 A | 12/1997 | Nashner et al. |
| 5,980,429 A * | 11/1999 | Nashner ............................ 482/8 |
| 2005/0014113 A1* | 1/2005 | Fleck et al. .................... 434/247 |
| 2008/0076637 A1* | 3/2008 | Gilley et al. ...................... 482/9 |
| 2010/0081116 A1* | 4/2010 | Barasch et al. ............... 434/252 |

OTHER PUBLICATIONS

Associated Press, Tiger Woods swing app available, Mar. 23, 2011, http://sports.espn.go.com/golf/news/story?id=6249863, Orlando, Florida.
Tony Olivero, Say Goodbye to Boxing Judges, Jun. 25, 2012, http://online.wsj.com/article/SB10001424052702304782404577488863709341728.html.

* cited by examiner

*Primary Examiner* — Robert J Utama
*Assistant Examiner* — Jerry-Daryl Fletcher

(57) ABSTRACT

Systems, methods, and other embodiments associated with instruction production are described. In one example, a system can comprise a difference component that makes an identification of a difference between an actual action of a user and a standard action for the user. The system also can comprise an instruction component that produces an instruction to instruct the user to change from the action of the user to the standard action for the user, where production of the instruction is based, at least in part, on the difference. The system further can comprise a non-transitory computer-readable medium configured to retain the instruction. Additionally, the system can comprise an output component configured to cause disclosure of the instruction.

20 Claims, 17 Drawing Sheets

INSTRUCTION PRODUCTION

BACKGROUND

A person can desire to gain a specific skill set and seek out a coach for instruction of the specific skill. For example, the person can desire to improve his or her golf swing. To improve his or her golf swing, the person (golfer) can contact a club professional at a local golf club for lessons. The golfer can meet with the club professional and the club professional can provide insight as to how the golfer can improve his or her golf swing.

BRIEF DESCRIPTION OF THE FIGURES

The accompanying drawings, which are incorporated in and constitute a part of the detailed description, illustrate various example systems, methods, and other example embodiments of various innovative aspects. These drawings include.

Figure 1:
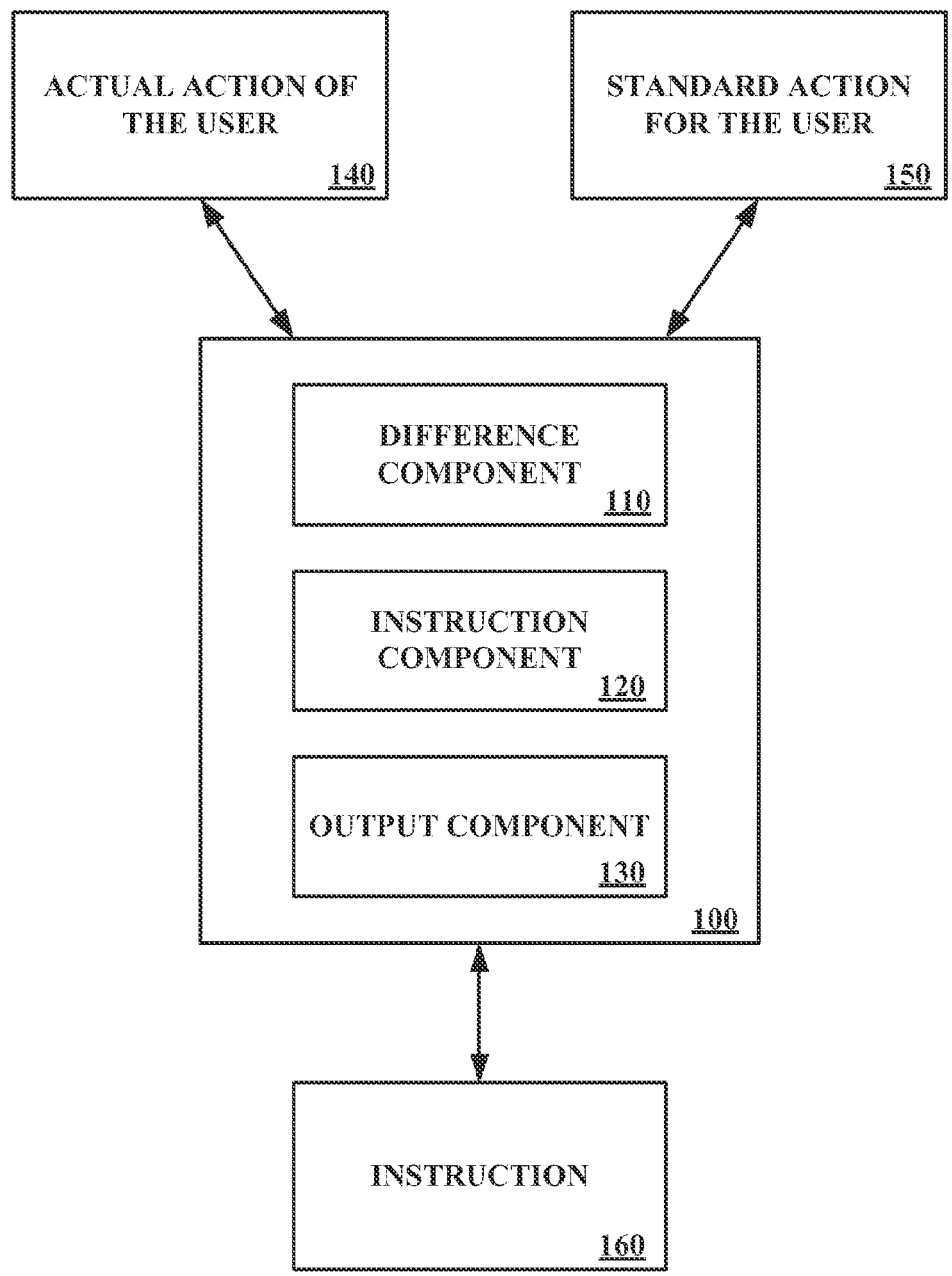
FIG. 1 illustrates at least one embodiment of a system that includes a difference component, an instruction component, and an output component.

It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. These elements and other variations are considered to be embraced by the general theme of the figures, and it is understood that the drawings are intended to convey the spirit of certain features related to this application, and are by no means regarded as exhaustive or fully inclusive in their representations. Additionally, it is to be appreciated that the designation 'FIG.' represents 'Figure'. In one example, 'FIG. 1' and 'Figure 1' are referring to the same drawing.

The terms 'may' and 'can' are used to indicate a permitted feature, or alternative embodiments, depending on the context of the description of the feature or embodiments. In one example, a sentence states 'A can be AA' or 'A may be AA'. Thus, in the former case, in at least one embodiment A is AA, and in another embodiment A is not AA. In the latter case, A may be selected to be AA, or A may be selected not to be AA. However, this is an example of A, and A should not be construed as only being AA. In either case, however, the alternative or permitted embodiments in the written description are not to be construed as injecting ambiguity into the appended claims. Where claim 'x' recites A is AA, for instance, then A is not to be construed as being other than AA for purposes of claim x. This construction is so despite any permitted or alternative features and embodiments described in the written description.

DETAILED DESCRIPTION

Described herein are example systems, methods, and other embodiments associated with instruction production. A golfer going to a club professional can be time consuming, expensive, and have other negative aspects. Therefore, it may be beneficial for the golfer to receive instruction from a system, such as an application on a mobile phone or other electronic device. The application can monitor how the golfer swings his or her golf club and automatically compare the golfer's golf swing against a preferred golf swing, such as the swing of a leading professional golfer. Based on a result of this comparison, the application can produce an instruction to the golfer.

In one example, the golfer can swing a golf driver (or utilize a different piece of sports equipment or other equipment in various examples and embodiments) and the application can monitor how the golfer swings the club. The application can identify that the golfer's backswing of the club comes to an angle of x degrees with respect to a predetermined reference line (or determine rotation, distance, ratios, or other metrics in various examples and embodiments). The application can include a video of an ideal golf swing of a professional golfer. In the professional golf swing, the professional golfer can have his or her backswing come to an angle of x-y degrees. Therefore the application can give an instruction to the golfer to change his or her backswing to better replicate the professional's swing. While aspects disclosed herein are described with golf-based examples or other specific examples, it is to be appreciated by one of ordinary skill in the art that these examples not intended to be limiting, and a physical motion where varying form can yield different results can be cognized under the disclosures herein.

The following paragraphs include definitions of selected terms discussed at least in the detailed description. The definitions may include examples used to explain features of terms and are not intended to be limiting. In addition, where a singular term is disclosed, it is to be appreciated that plural terms are also covered by the definitions. Conversely, where a plural term is disclosed, it is to be appreciated that a singular term is also covered by the definition. In addition, a set can include one or more member(s).

References to "at least one embodiment", "one embodiment", "an embodiment", "one example", "an example", and so on, indicate that the embodiment(s) or example(s) so described may include a particular feature. The embodiment(s) or example(s) are shown to highlight one feature and no inference should be drawn that every embodiment necessarily includes that feature. Multiple usages of the phrase "in at least one embodiment" and others do not necessarily refer to the same embodiment; however this term may refer to the same embodiment. It is to be appreciated that multiple examples and/or embodiments may be combined together to form another embodiment. Where lists of samples or embodiments are provided, such lists are not intended to be exhaustive listings, but rather provide one of ordinary skill in the art with a conceptual framework to understand various possibilities or classes to be applied in the situation including options that may not be expressly listed.

"Computer-readable medium", as used herein, refers to a medium that stores signals, instructions, and/or data. A computer may access a computer-readable medium and read information stored on the computer-readable medium. In at least one embodiment, the computer-readable medium stores instruction and the computer can perform those instructions as a method. The computer-readable medium may take forms, including, but not limited to, nonvolatile media (e.g., optical disks, magnetic disks, and so on), and volatile media (e.g., semiconductor memories, dynamic memory, and so on). Example forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Component" and the like as used herein, includes but is not limited to hardware, firmware, software stored or in execution on a machine, a routine, a data structure, and/or at least one combination of these (e.g., hardware and software stored). Component, logic, module, and interface may be used interchangeably. A component may be used to perform a function(s) or an action(s), and/or to cause a function or action from another component, method, and/or system. A component may include a software controlled microprocessor, a discrete logic (e.g., ASIC), an analog circuit, a digital circuit, a programmed logic device, a memory device containing instructions, a process running on a processor, a processor, an object, an executable, a thread of execution, a program, a computer and so on. A component may include one or more gates, combinations of gates, or other circuit components. Where multiple components are described, it may be possible to incorporate the multiple components into one physical component. Similarly, where a single component is described, it may be possible to distribute that single component between multiple physical components. In at least one embodiment, the multiple physical components are distributed among a network. By way of illustration, both/either a controller and/or an application running on a controller can be one or more components.

FIG. 1 illustrates at least one embodiment of a system 100 that includes a difference component 110, an instruction component 120, and an output component 130. The difference component 110 makes an identification of a difference between an actual action of a user 140 and a standard action for the user 150. The instruction component 120 produces an instruction 160 to instruct the user to change from the actual action of the user 140 to the standard action for the user 150, where production of the instruction 160 is based, at least in part, on the difference. The output component 130 causes disclosure of the instruction 160. In at least one embodiment the difference component 110, the instruction component 120, and the output component 130 are part of a mobile device.

Returning to the above example of the golf swing, the golfer (user) can provide a test swing that is the actual action of the user 140. In at least one embodiment, the test swing can be a series of swings, an average of swings, or a representative user swing modeled from a series of provided swings. The user can select a golf swing that the golfer would like to emulate, such as the golf swing of Tiger Woods (or another professional, or another form not associated with a professional), and this golf swing of Tiger Woods becomes the standard action for the user 150. The difference component 110 can compare the user's golf swing to the golf swing of Tiger Woods. The instruction component 120 can determine how the user should change his or her golf swing based on the comparison. From this, the instruction component 120 can determine how the user should change his or her golf swing to more emulate their swing to the swing of Tiger Woods. The instruction component 120 produces the instruction 160 that instructs the golfer on how to change his or her swing and the output component 130 causes the instruction 160 to be disclosed (e.g., the instruction 160 is displayed on a screen, the instruction 160 is given audibly, et cetera). For example, the golfer may bend his or her knees less than Tiger Woods and therefore the instruction 160 can be for the golfer to bend his or her knees more, to bend his or her knees z degrees, et cetera.

As has been suggested, instruction 160 can involve more than defining the differences, but also describe aspects not necessarily directly related to, in contact with, or the focus of a particular technique. By way of example, a less experienced golfer may myopically view the end result of a swing to be purely a product of arm motion. However, the starting position, end position, and motion between both for head, shoulders, hips, legs and feet can be influential. In this regard, a golfer's movement can be carefully tracked and statistical analysis applied to inputs and outputs at different stages of motion on different portions of the body to determine the changes that can be implemented to more accurately emulate a desired form.

In at least one embodiment, the actual action of the user 140 and the standard action for the user 150 are for the same activity (e.g., golfing, shooting a basketball, playing a musical instrument). In at least one embodiment, the actual action of the user 140 is a physical movement of the user. In at least one embodiment, the standard action for the user 150 is a different activity for the user than for which the actual action of the user 140 is performed. For example, the user can practice Taekwondo. Depending how the user executes specific moves of the Taekwondo, the system 100 can determine another martial art of the user to practice. For example, two potential standard actions of the user can be practice of Judo and practice of Brazilian Jiu-Jitsu (both grappling martial arts) while Taekwondo (a striking martial art) is the actual action of the user. The difference component 110 can compare the user's Taekwondo against example moves of Judo and Brazilian Jiu-Jitsu. The instruction component 120 can determine which has a lesser difference for the user—Judo or Brazilian Jiu-Jitsu.

A determination of lesser difference can be based on, for example, a scoring system (e.g., a scoring system used to determine the winner of a contest). The scoring system can capture numerical representations of various types of motion and determine scores for particular motions. Motions recorded can be in two or more dimensions. In some embodiments, a plurality translational and rotational degrees of freedom, as well as the particular accelerations and velocities associated with such components of motion, can be scored in isolation or together to generate scores associated with certain motions or techniques. Motions or techniques found to have smaller differences between scores can be preferred in the determination. In one example, if the user's Taekwondo specific moves would make the user more likely to learn Judo more quickly, then the instruction component 120 can create the instruction that suggests that the user learn Judo and the output component 130 can disclose the instruction 160 accordingly.

In at least one embodiment, at least one sensor can be used for information and/or scoring purposes. In one example, a sensor can be placed in a right and left boxing glove (e.g., wrist area of the glove so as not to influence a punch) of two boxers that engage in an amateur or professional boxing match. The sensors can obtain and/or process information related to each boxer to determine punch strength, punch form, if a combination occurs, and other determinations. These determinations can be used to assign scores to the boxers.

In one example of the scoring system, punch form can be used. For example, the motion of a jab of a boxer with the sensor can be determined and compared against a form jab. Depending how close the boxer's jab is to the form jab can determine a number of points the boxer receives for the punch. The number of points can also be influenced by how the punch impacts the opposing fighter. For example, a form jab that misses an opponent can be given no score, a form jab that marginally impacts the opponent (e.g., impacts with low force, impacts at a less than desirable location, et cetera) can be given a relatively high score, a non-form jab that marginally impacts the opponent can be given a relatively low score, and a form jab that strongly impacts the opponent (e.g., impacts with a force above a threshold value, impacts within a particular body or facial zone, et cetera) can be given a perfect score. The score given with punches can be combined with subjective judging to produce a score, provided to judges for use in determining round score, provided to broadcasters to give views more information on how a fighter performs, et cetera.

In one example, the scoring system is used as part of a training session. An amateur boxer can have a sparring session with another amateur boxer. The purpose of the sparring session can be to have the amateur boxer improve his or her form. In addition to form of the boxing punches, the sensor can be used to score or provide other information with relation to foot placement, body movement, et cetera.

In at least one embodiment, if an acceptable standard action for the user does not exist, then the instruction component 120 can create such a standard action for the user. The instruction component 120 can collect various information, such as information about the user, information about successful individuals performing the action, and other information and based on this information the instruction component 120 can produce the standard action for the user 150. In one example, the user can desire to be a gymnast, but the user may not have the body type of a prototypical gymnast (e.g., he or she may be significantly taller than the prototypical gymnast). Due to this difference, a suitable and/or usable standard action for the user may not exist. The instruction component 120 can use an existing standard action for the user as a template and make modifications to the existing standard action for the user to produce the standard action for the user 150. With the created standard action for the user, the difference component 110 can determine the difference between the created standard action for the user and the actual action of the user 140, the instruction component 120 can produce the instruction 160 based on this difference, and the output component 130 can cause the instruction 160 to be disclosed.

In at least one embodiment, the technique of successful individuals performing the action can be ignored if any exists. Instead, a standard action can be determined through statistical analysis. A user can perform the action a plurality of times, and the result can be recorded, observed, and/or otherwise provided in a fashion similar to the provided or collected actual action. Various techniques of statistical analysis to be applied to determine correlation and/or causation of results based on corresponding changes to the form of the action. Resulting statistical models can be used to project improved form for the action that will give the user a more-desired result.

In at least one embodiment, the instruction 160 is, at least in part, an instruction to use a particular piece of equipment. The system 100 can be used in identifying an item the user should use. In one example, the user can desire to purchase a new guitar. The user can play a guitar already owned and this can be the actual action of the user. Various factors such as force used by the user to strike strings, quickness of the user to move his or her hand among different frets, and other factors of the actual action of the user 140 can be evaluated to find an action (e.g., the standard action for the user 150) that produces a preferred (e.g., optimal) guitar sound. Based on a comparison, the instruction component 120 can identify a guitar that would have improved sound over the guitar already owned based on the user's guitar playing style. Therefore, the instruction can be what guitar to purchase, a list of preferable guitars, a ranked list of preferable guitars, et cetera.

As has been discussed, results can be provided for analysis. In the example of a guitar, a microphone can be used to record audio data, which can be compared to ideal audio data or projected audio data based on an audio input (e.g., music recorded in a mp3 file) or non-audio input (e.g., sheet music or other detailed descriptions). In the example of a golf swing, a ball's coordinate location can be known, before, during, and after the swing to determine at least direction and distance based on the form given. In at least one embodiment, the ball or other components can include various positioning systems to expedite or increase accuracy of such location-based analysis. In at least one embodiment, image processing can be used in conjunction with still or video information relating to how and when a golf ball is struck and its trajectory and changing velocity thereafter. Such examples focused in particular skills are provided for illustrative purposes, and one of ordinary skill in the art will appreciate many other possibilities related to these and other techniques for determining and analyzing results.

Figure 2:
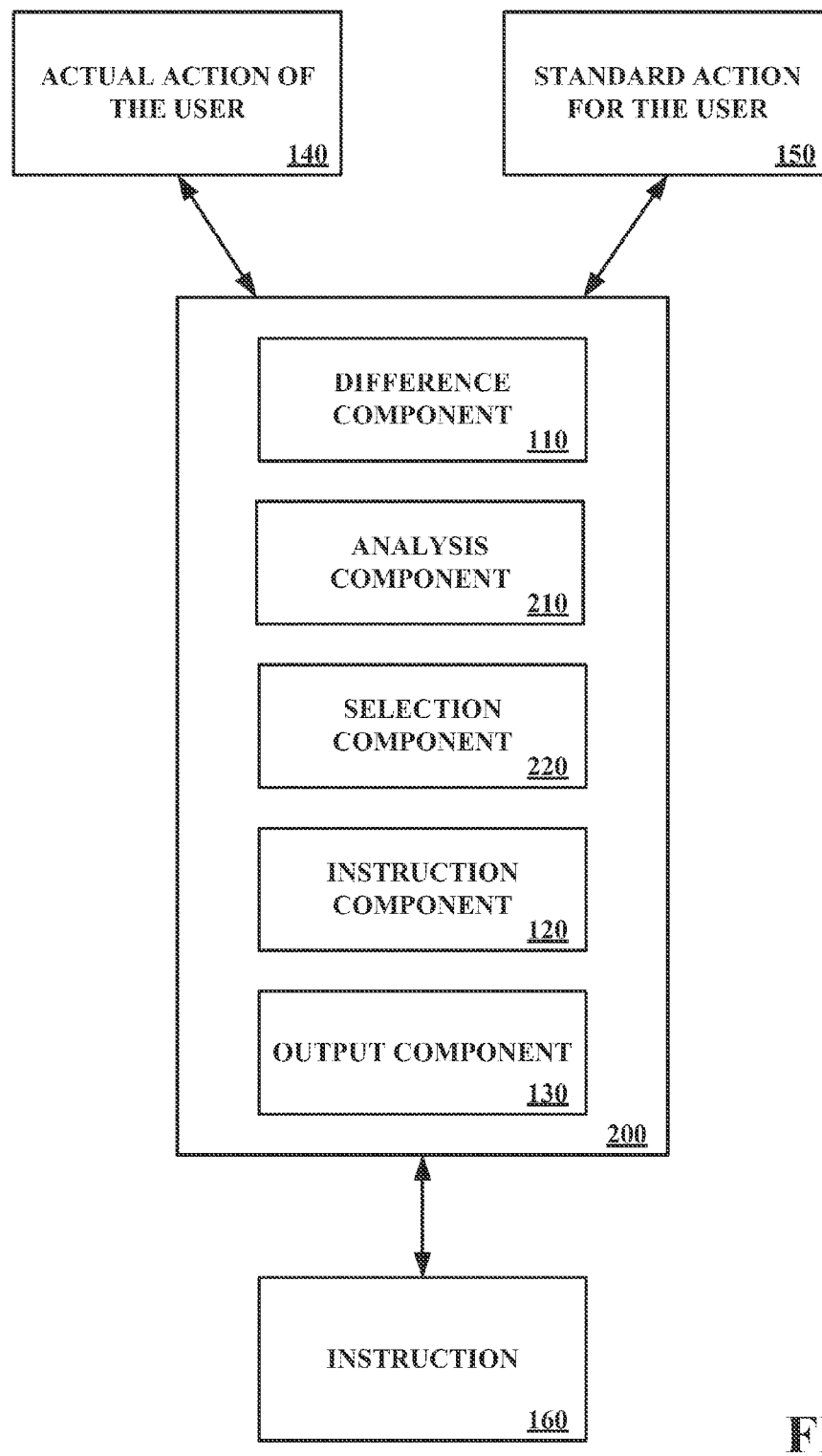
FIG. 2 illustrates at least one embodiment of a system that includes the difference component, an analysis component, a selection component, the instruction component, and the output component.

FIG. 2 illustrates at least one embodiment of a system 200 that includes the difference component 110, an analysis component 210, a selection component 220, the instruction component 120, and the output component 130. The analysis component 210 analyzes the difference and the selection component 220 selects the instruction 160 from among at least a first instruction and a second instruction that are different instructions. The instruction 160 is produced in response to the selection of the instruction 160 and the selection is based, at least in part, on the difference.

In one example, the user can have a running motion for long distance runs that is the actual action of the user 140. The user can desire for a more efficient running motion that is the standard action for the user 150. The first instruction can be to change upper body angle while the second instruction can be to change stride length. It may be easier for the user to follow one instruction and therefore the first instruction or the second instruction can be selected and caused to be disclosed. For example, the first instruction can be caused to be disclosed. The user can change the actual action of the user 140 such that the upper body angle is changed. Once this change is mastered, the second instruction can be selected and disclosed.

In one example, the user can be running in a marathon with a particular running motion that is the actual action of the user 140. As the user runs the marathon, the form of the particular running motion can break down causing the user to run slower. The system 200 can function to provide an instruction to the improve form and the improved form is the standard action for the user 150. Part of the form breakdown can be the user's legs not being lifted as high due to lactic acid buildup. The first instruction can be for the user to lift his or her legs higher. However, due to the lactic acid buildup, this may not be feasible for the user. The system 200 can identify this infeasibility (e.g., through bio-monitoring by way of sensors, by user response (e.g., the first instruction is given and the user rejects the first instruction), et cetera) and disregard the first instruction. The second instruction can be for the user to change the motion with his or her arms. The system 200 can identify that the second instruction is feasible and thus select and cause disclosure of the second instruction.

In one example, the instruction 160 is one instruction or more than one instruction. A runner's form can be made up of many different elements such as stride length, back posture, arm movement, and other elements. The instruction 160 can be to change multiple elements of the user's form and/or instruct the user to keep doing a certain aspect. The instruction 160 can be exclusively the first instruction or the second instruction as well as be both the first instruction and the second instruction. In at least one embodiment, the selection of the instruction 160 by the selection component 220 is based, at least in part, on a physical characteristic set of the user (e.g., user body characteristics, real-time bio data of the user, injury information on the user, et cetera).

Figure 3:
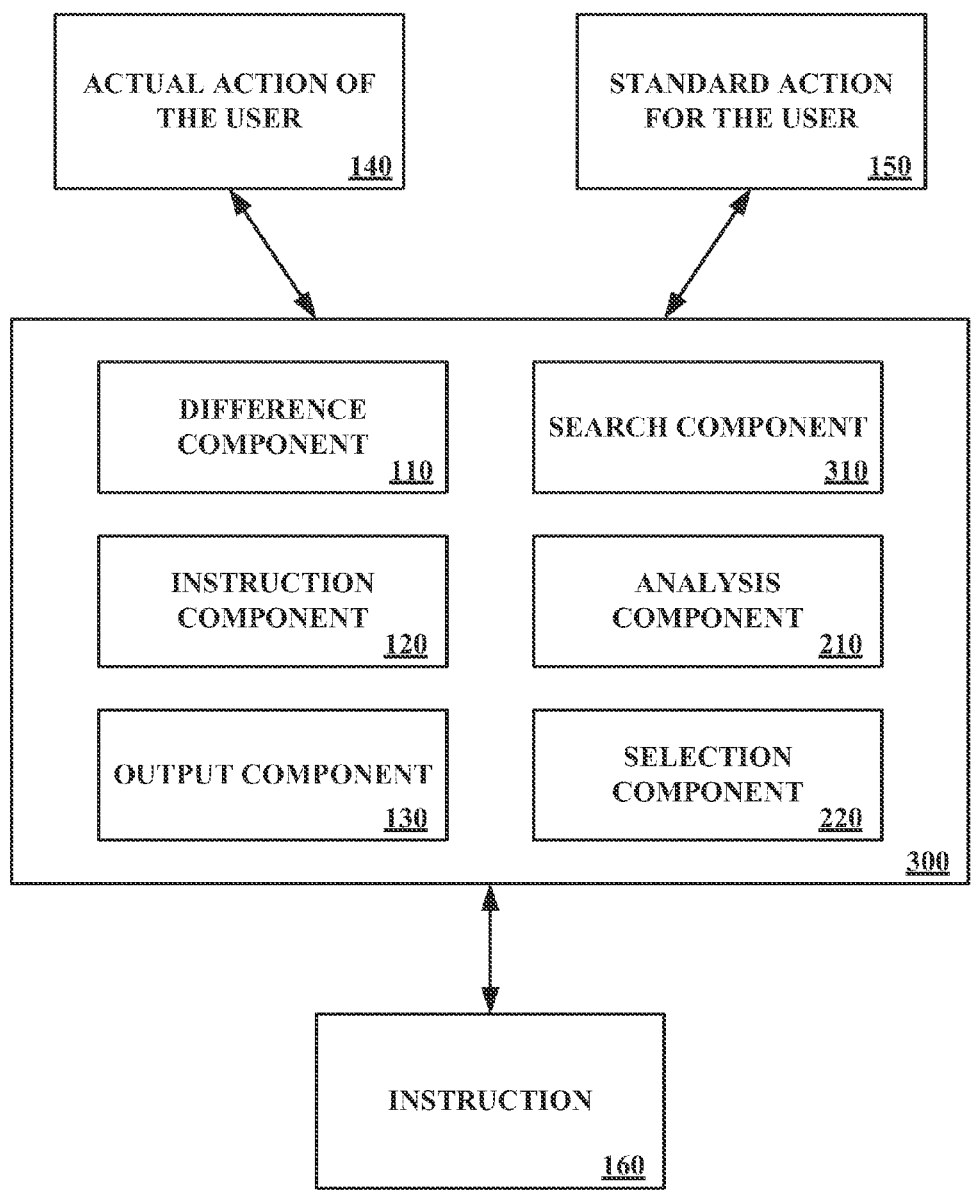
FIG. 3 illustrates at least one embodiment of a system that includes the difference component, a search component, the instruction component, the output component, the analysis component, and the selection component.

FIG. 3 illustrates at least one embodiment of a system 300 that includes the difference component 110, a search component 310, the instruction component 120, the output component 130, the analysis component 210, and the selection component 220. The search component 310 searches a source upon which to base the first instruction and the second instruction, where the first instruction is selected by the selection component 220 and where the second instruction is not selected by the selection component 220. The search is based, at least in part, on the difference.

The search component 310 can find the instruction source. In one example, the user can provide the instruction source name and/or location and the search component 310 searches the information source consistent with what the user provides. In one example, the search component 310 can proactively (e.g., automatically) determine the instruction source to search.

While aspects disclosed herein relate to physical actions, it is to be appreciated by one of ordinary skill in the art that aspects can be practiced actions that may not be considered physical actions. Feedback can be provided regarding a wide variety of behaviors or activities.

In one example, the user can request for an instruction on how to have more meaningful online conversations. For example, the user can request to have conversations with single females where the females give answers to questions that are longer in length. The analysis component 210 can analyze online conversations of the user that serve as the actual action of the user 140 while the standard action for the user 150 is a subjective standard by the user of more meaningful online conversations. Based on a result of the online conversation analysis, the search component 310 can search out for an information source that provides guidance on how to have better online conversations, samples of conversations that have longer answers than that of the user, et cetera. The search component 310 can perform a search for the information source for information upon which the base the first instruction and the second instruction. The search can be performed with the goal of finding information that can be used by the instruction component 120 to produce (e.g., generate, create, turnout, modify an existing instruction, et cetera) the instruction 160 to the user. The analysis component 210 can analyze these instructions and the selection component 220 can select the first instruction.

In one example, the search component 310 can find and access an instruction database that functions as the source. Returning to the online conversation example, the instruction database can be an Internet website with suggested questions to ask a female to facilitate continued and engaging conversation. The search component 310 can find the first instruction and the second instruction from within the instruction database. In making this find, the analysis component 210 can analyze the difference and based on a result of the analysis the search component 310 can find the first instruction and the second instruction. The analysis component 210 can then analyze the first instruction and second instruction to determine if either the first instruction or the second instruction is a suitable instruction (e.g., done by way of a scoring system). If the first instruction or the second instruction is not a suitable instruction, then the analysis component 210 can initiate the search component 310 to find a third instruction. In at least one embodiment, the third instruction can then be characterized as the first instruction with the original first instruction being disregarded. The first instruction (formerly third instruction) can be analyzed, identified as suitable, and selected by the selection component 220. The instruction component 120 can designate the first instruction as the instruction for use and this designation can function as production of the instruction 160. The output component 130 can cause the instruction 160 to be disclosed (e.g., send a command for disclosure of the instruction 160 to occur, disclose the instruction 160, et cetera).

In at least one embodiment, the instruction 160 can be developed, at least in part, from a variety of sources. In at least one embodiment, models (e.g., mathematical models quantifying at least a portion of activity related to the instruction 160) can be developed in advance of using preexisting databases for employment. The instruction 160 can be developed on-the-fly such as using data observed in a particular session or window of time (e.g., during use of the system 300). In at least one embodiment, sources of data used in or for instruction 160 can have varying levels. For example, a vendor's databases can have one level (e.g., "trusted source") whereas community-developed databases can have another (e.g., "reviewed source"), and individual developed databases can have another still (e.g., "unverified source"). Data from a trusted source can be given more weight in developing the instruction 160 than data from an unverified source (e.g., a conflict can be resolved in favor of the trusted source, data from the trusted source can be used more frequently than data from the untrusted source, data from the trusted source can be scored higher than data from the unverified source, et cetera).

Figure 4:
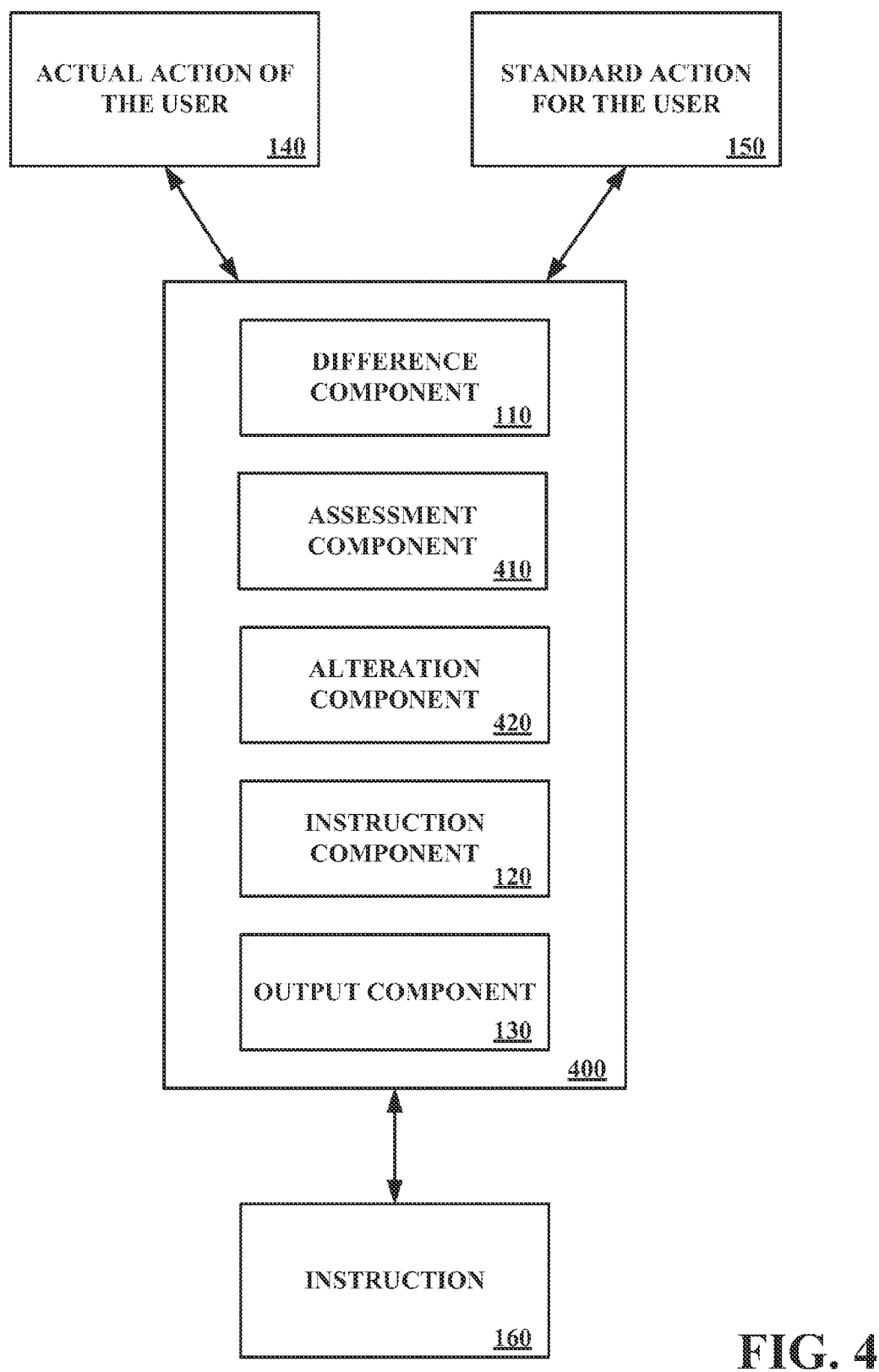
FIG. 4 illustrates at least one embodiment of a system that includes the difference component, an assessment component, an alteration component, the instruction component, and the output component.

FIG. 4 illustrates at least one embodiment of a system 400 that includes the difference component 110, an assessment component 410, an alteration component 420, the instruction component 120, and the output component 130. The assessment component 410 determines if the difference is reversible, where the actual action of the user 140 is defined in terms of a deviation from the standard action for the user 150. The alteration component 420 identifies an alteration for the standard action for the user 150. The alteration component 420 functions after the determination is that the difference is not reversible, where the alteration facilitates an outcome that is similar to the outcome for the standard action for the user 150 and where the instruction 160 is based, at least in part, on the alteration.

In one example, the standard action for the user 150 can be a cooking recipe, such as making a pasta sauce. The actual action of the user 140 can be an action set taken by the user to follow the cooking recipe. The cooking recipe can call for a teaspoon of pepper to be mixed into a sauce base, but the user can add a tablespoon of pepper and mix in the tablespoon. The system 400 can identify this incorrect addition of pepper and the assessment component 410 can determine that it would be impractical to remove pepper from the recipe. As such, the alteration component 420 can determine (e.g., by way of a scoring system, by analysis of online reviews, et cetera) if the cooking recipe could be altered to compensate for the extra pepper added and have a final pasta sauce similar to the pasta sauce that is produced from following the standard action for the user 150. In at least one embodiment, the compensation is not an increase of quantities of other ingredients in proportion to the over-mixed ingredient. For example, the alteration component 420 can determine that adding a certain quantity of a specific ingredient can counteract the impact of the extra pepper in the pasta sauce. Therefore, the instruction component 120 can produce the instruction 160 such that the instruction 160 instructs that the certain quantity of the specific ingredient be added to the pasta sauce and the output component 130 can cause the instruction 160 to be disclosed. In at least one embodiment, the cooking recipe cannot be altered to compensate for the extra pepper and the output component 130 can cause a notice to be disclosed to the user of the situation. In at least one embodiment, a user following a recipe can lack certain ingredients or sufficient quantities thereof (e.g., that are not in his or her kitchen), and the recipe can be altered to use alternatives or compensate for a lack of a particular ingredient (e.g., that are in his or her kitchen).

In at least one embodiment, when the difference is reversible the instruction 160 is to undo the actual action of the user 140. Returning to the example of the cooking recipe, the cooking recipe can call for a tablespoon of pepper, but the user puts in a teaspoon. The assessment component 410 can determine if this action is reversible (e.g., impossible to be reversed, impractical to be reversed, reversal would not have the desired outcome on end product, et cetera). For example, the assessment component 410 can determine that adding another teaspoon of pepper is reasonable and as such the difference (e.g., adding a teaspoon instead of a tablespoon) is reversible. In response, the alteration component 150 can notify the instruction component 120 that the instruction 160 should be generated detailing that two more teaspoons of pepper should be added. This can occur without alteration to the standard action for the user 150. The instruction component 120 can produce the instruction 160 and the output component 130 can cause the instruction 160 to be disclosed.

In one example, the cooking recipe can be for baking cookies. The first step of the recipe can be to add a half stick of butter. However, the user can add a stick of butter. The assessment component 410 can determine that the user can remove half of the stick added and therefore the difference is reversible. The alteration component 420 can identify the alteration of the standard action for the user 150 as adding a step of removing half the stick of butter. The instruction component 120 can produce an instruction of removing half the stick of butter and the output component 130 can cause this instruction to be disclosed.

Figure 5:
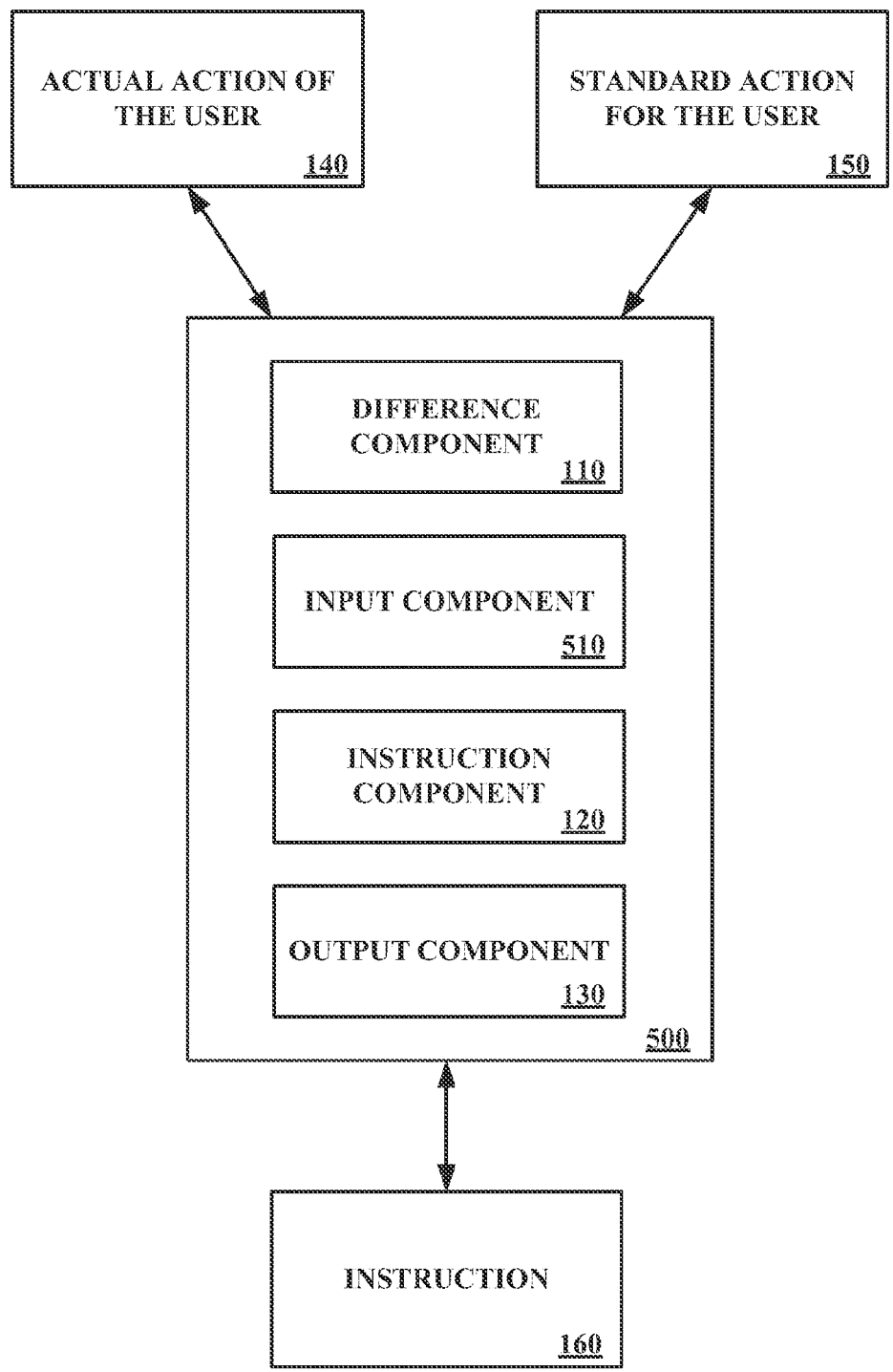
FIG. 5 illustrates at least one embodiment of a system that includes the difference component, an input component, the instruction component, and the output component.

FIG. 5 illustrates at least one embodiment of a system 500 that includes the difference component 110, an input component 510, the instruction component 120, and the output component 130. The input component 510 collects a goal input for the user. The instruction 160 facilitates the goal input being met.

In one example, the user can have a goal of being able to slam dunk a basketball. The user can enter this goal into a graphical user interface that is part of the input component 510 as the goal input. Based on this goal input, the input component 510 can determine the standard action for the user 150. In one example, the difference component 110 can evaluate how the user performs a basketball layup, how close the user comes to dunking the basketball, et cetera as the actual action of the user 140. Based on a result of this evaluation, the input component 510 can select the standard action for the user 150. In at least one embodiment the user selects the standard action for the user 150 to meet the goal input. In at least one embodiment, the input component 510 evaluates the goal input and based on a result of this analysis the input component 510 selects the standard action for the user 150. In another example, a pitcher can be pitching with a minor league baseball team with the hope of reaching a Major League Baseball club with reaching the Major League Baseball club being the goal input. The input component 510 can evaluate various factors such as a parent club's current roster, other prospects, and physical attributes of the user. The input component 510 can determine that the best way for the pitcher to reach the Major League Baseball club is to learn to throw a with a submarine delivery since there is an absence of a submarine delivery pitcher on the parent club's roster as well as the rosters of other clubs (e.g., for trade purposes). While this may not be the pitch that has the highest ceiling and this may cause a higher likelihood of injury, adopting this type of delivery could be anticipated as the best route to the Majors. Based on this, the standard action for the user 150 can be chosen as a textbook submarine delivery and/or the instruction 160 can be consistent with the pitcher learning the submarine delivery.

Determinations can be made in at least this example using statistical analyses of leagues, teams, rosters, individuals, and the characteristics and/or performance thereof. Statistical information can be sourced from publicly accessible news sources (e.g., sports websites), private sources (e.g., scouting or club databases), user input, et cetera. In at least one embodiment, user input can include video provided or selected by the user that can be analyzed according to pre-programmed packages or user-defined metrics. In the baseball example, the minor league pitcher can import at least one video of one or more major league pitchers from one or more angles and provide such to at least a portion of software that analyzes the motion on at least one video and determines statistical relationships and distinctions. In at least one embodiment, a pitching plug-in can be used with the software that is pre-programmed to the idiosyncrasies of baseball pitching. Such idiosyncrasies can be generalized or increasingly specific. An example of a generalized pitching plug-in is a plug-in designed to identify trends in a group of successful pitchers (e.g., pitchers that have spent several years on a Major League roster). Specifics can be used to filter or analyze pitchers sharing common characteristics, such as dominant hand, height, weight, type of pitch and so forth. In at least one embodiment, a user can define baselines for statistical analysis. For example, the software can proactively (e.g., automatically) recognize different portions of Major League pitchers in at least one video. In at least one embodiment, the user can define at least one baseline (e.g., at least one point and/or arbitrary axis from which various angles and/or distances can be measured, such as angle of different portions of the arm when the pitch is released, torso or leg motion, pitch angle during flight, and so forth). Motion can be analyzed over a single sample or a variety of samples to provide data for statistical analysis that can then be applied to the motion of the user.

In one example, the standard action for the user 150 is known and/or the difference is known before the input component 510 collects the goal input. For the example, how the user performs the basketball layup, how close the user comes to dunking the basketball, et cetera can function as the actual action of the user 140. In addition, the user can identify a video of Michael Jordan dunking a basketball that functions as the standard action for the user 150. The difference component 150 can compare the actual action of the user 140 against the standard action for the user 150 to produce the difference. The input component 510 can evaluate the difference, the actual action of the user 140, the standard action for the user 150, other metadata (e.g., a goal input of a user similar in age, life state, school, et cetera), or a combination thereof. Based on this evaluation, the input component can identify the goal input, where identification of the goal input is a type of collection. In at least one embodiment, the input component 510 infers the goal input through use of at least one artificial intelligence technique.

Long-term, step-wise plans can be developed using goal input and a plurality of actual actions of the user. In at least one embodiment, a user attempting to dunk a basketball can input or be observed performing a variety of movements to determine impediments to the performance of a composite motion. For example, one or more basketball players capable of dunking can be known to be capable at certain times to sprint a distance, high jump heights, and long jump distances. The user can be informed of deficiencies with regard to relevant aspects of training related to dunking, and be provided instructions (e.g., at least a portion of a workout) designed to remedy the deficiencies. In an example, the user can have an excellent long jump but a poor high jump compared to one or more basketball players capable of dunking, and this can be determined to be one factor influencing an inability to dunk from a particular position on the court. In addition to information about modification to the dunking motion, instructions related to improving high jump can be provided.

In an example, an entity other than the user enters the goal input. In one example, a reality dancing competition can have celebrity contestants learning different dances, such as the waltz or the polka. Viewers of the competition can vote on which dances they would like different celebrities to learn for the coming week. The input component 510 can aggregate these votes and evaluate the aggregate result. Based on the result of this evaluation, the input component 510 can select the goal input (e.g., celebrity A performs the waltz while celebrity B performs the polka, celebrities A and B perform the polka, et cetera) and the system 500 can provide the instruction 160 on how to dance to the respective celebrity, dance partner, show producer, et cetera In one example, the system 500 is used as a tool to coach a football team. The actual action of the user 140 can include how the team functions together (e.g., how the offense functions together) as well as how individual members of the team function. The standard action for the user 150 can be for the team to run a sweep off the right tackle. The input component 110 can evaluate metadata and determine that the goal input is to run an outside play to the right. The instruction component 120 can produce an instruction set of multiple instructions that function as the instruction 160 for the coach on how to run the play (e.g., how a lineman should block, how fast the running back should run, et cetera).

Figure 6:
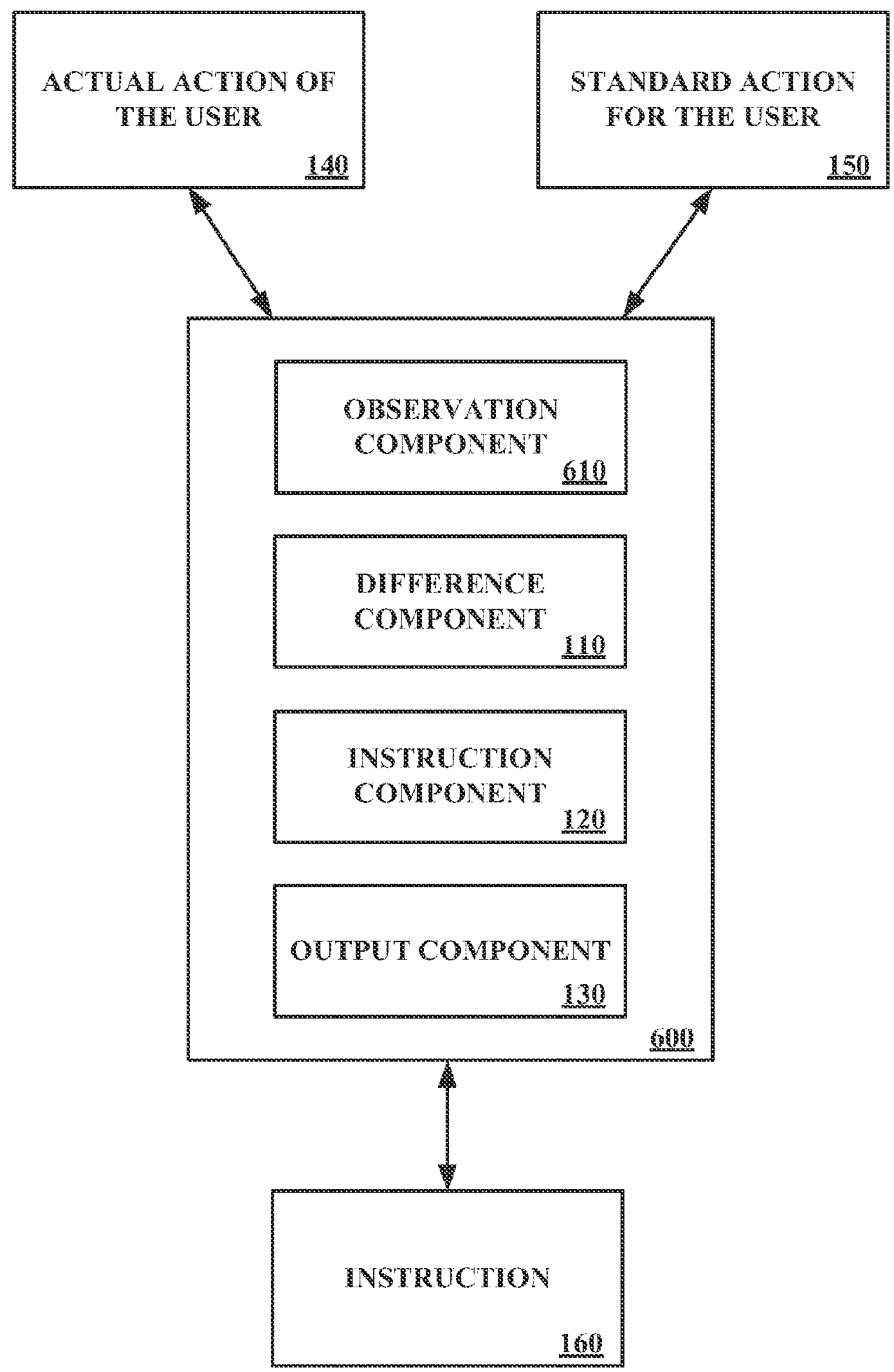
FIG. 6 illustrates at least one embodiment of a system that includes an observation component, the difference component, the instruction component, and the output component.

FIG. 6 illustrates at least one embodiment of a system 600 that includes an observation component 610, the difference component 110, the instruction component 120, and the output component 130. The observation component 610 observes the actual action of the user 140, where the identification of the difference performed by the difference component 110 is performed after the actual action of the user 140 is observed by the observation component 610. The observation component 610 can be part of, or leverage portions of (e.g., image capture hardware, processor, memory), the mobile device (e.g., along with the difference component 110, the instruction component 120, and the output component 130). In at least one embodiment, at least a portion of the observation component 610 (or other components) can be available over a network such that the mobile device transmits and receives information for action elsewhere. In at least one embodiment, all aspects can be local (e.g., embodied in or on, at the same physical location) to the mobile device. Hybrid techniques, such as solutions including some cloud-based resources and some local resources can be applied without departing from the scope herein.

In at least one embodiment, the observation component 610 can function as a camera that views the user in action and based on this the actual action of the user 140 is determined and thus observed. In one example, the user can perform a dance. The observation component 610 can view this dance and record a copy of the viewed dance (e.g., in a non-transitory computer-readable medium). Thus, the copy retains a recording of the actual action of the user 140.

In at least one embodiment, the observation component 610 can perform processing with regard to the actual action of the user 140. In one example, the user can be performing an action among other users. In this example, the user can be an individual dance member of a chorus line. The observation component 610 can extract out actual actions of other members of the other members of the chorus line and identify the user and as such the actual action of the user 140. In at least one embodiment, the observation component 610 can make a determination based on the user's physical characteristics. In one example, how much the user sweats, facial expressions of pain or exhaustion, and others can be observed by the observation component 610 and this observation can be used by the instruction component 120 (e.g., if the user has a facial expression consistent with pain, then the instruction component 120 can draw an inference that the instruction 160 should not push the user harder). Such aspects can be identified through statistical analyses of similar aspects (e.g., facial expressions) that can be pre-programmed or provided by users. In at least one embodiment, angles and movements to facial features can reveal trends, and such trends can be associated with particular moods, feelings, or inferences. In one example, the observation component 610 can make calculations on the user's physical characteristics. The user's arms can be equal to z % of the user's height. Based on this arm to height ratio, the standard action for the user 150 can be selected and/or the instruction component 120 can produce the instruction 120.

In at least one embodiment, the observation component 610 functions as a motion sensor. In one example, the user can desire to improve his or her cycling motion when performing long distance cycling. The user can activate (e.g., start observing motion) the application on his or her mobile device and/or attach the mobile device to their body, clothing, the bicycle, et cetera. In one example, the application can identify that the user has begun cycling and self-activate. As the user rides, the observation component 610 can observe physical motion of the user, biometric data of the user, performance of the bicycle, et cetera. The instruction component 120, in producing the instruction 160, can take into account the difference as well as other information such as the performance of the bicycle and/or the biometric data of the user.

In at least one embodiment, observation component 610 can be used with regard to an aspect of the standard action for the user 150. In one example, the user can have a particular golf swing that is the actual action of the user 140 and the golf swing of Tiger Woods is the standard action for the user 150. The mobile device with the motion sensor can be placed in the pocket of the user. As the user swings, the motion sensor (that functions as the observation component 610) can monitor hip movement of the user. Based on this hip movement, the instruction 160 can be produced.

In at least one embodiment, the observation component 610 is coupled to a piece of equipment. For example, an apparatus that includes the observation component 610 can be placed into part of a boxing glove (e.g., the wrist of the boxing glove). As the user punches with the glove, the movement of the hand, force of the hand, et cetera can be measured. The apparatus can also be used to understand placement of the hands when not punching, how much of a blow was absorbed by the gloves, movement of a boxer, et cetera In addition, the apparatus could be in the right and left hand gloves of the boxer as well as in the gloves of an opponent and/or sparring partner. These measurements can be used to understand the actual action of the user 140 that is used by the difference component 110. The instruction component 120 can provide an instruction 160 for use against a specific fighter (e.g., based on readings from the apparatus in the gloves of the opponent and/or sparring partner). The apparatus can be used for other purposes, such as gathering punch data for display (e.g., by the output component 130), for use in scoring the boxing match (e.g., information given to judges for use in scoring, for use in an electronic scoring system, et cetera).

In at least one embodiment, a user can utilize techniques herein to modify a technique for a particular opponent. In the above example, one of the boxers can be highly successful and have excellent technique, but is expecting a match against a challenger whose technique counters that of the boxer. The boxer can utilize systems and methods herein to temporarily or permanently modify an otherwise successful style to increase the likelihood of success against the challenger. In one example, sensors can be placed in the right and left glove a fighter, the right and left shoe of the fighter, a mouthpiece of the fighter, and a cup hook and loop of the fighter. The fighter can spar with a partner that fights in a similar style to that of an upcoming opponent. Analysis can be performed of how the fighter performs in the sparring session as both a general style and for the style of the opponent. If the fighter performs in a generally positive manner, but a poor manner in view of the opponent's style (e.g., the fighter normally does not move much and has good hand defense, but this is a risky strategy due to the power of the opponent and the opponent's history of being able to get through good hand defense), then an instruction can be produced with the intent of changing style to better fit against the opponent. In at least one embodiment, the instruction can be something that not only is easily learned for the opponent, but can also be easily unlearned after the fight with the opponent so the fighter an return to the previously successful style.

In at least one embodiment, the user wears a suit with identification points and the observation component 610 can observe the actual action of the user through use of the suit with the identification points. The identification points can send signals for certain parts of the user's body, such as joints, end points (e.g., hands, feet, et cetera), et cetera The observation component 610 can collect these signals and identify the actual action of the user 140 (e.g., the exact actual action of the user or an approximation of the actual action of the user). With the actual action of the user 140 identified, the instruction component 120 can produce the instruction 160.

In at least one embodiment, a user does not wear a suit but applies markers to their body. For example, different shapes can be drawn or affixed on or to points of the body or equipment to facilitate identification and/or analysis by observation component 610 or other components. In at least one embodiment, various shapes, sizes, and colors can be associated with different parts or aspects. In at least one embodiment, tagging or marking can be performed electronically without a physical suit or marker employed. For example, video can be imported and identified using various machine vision techniques or manual identification of points of interest (e.g., body parts, equipment, orienting features within one or more frames, and others). Machine learning can be used to train at least a portion of the system for recognition. Automatic-sizing and/or scaling can occur based on the size of known objects in a frame (e.g., known diameter of baseball). In at least on embodiment, scaling can occur by other means such as user provisioning or information related to the distance between a camera and a subject.

In at least one embodiment, a piece of equipment is adapted for use in the system 600. For example, a golf club, baseball bat, helmet, ball, glove, shoe controller, et cetera, or portions thereof (e.g., head, grip, and so forth) can include one or more sensors, transmitters, receivers, or other components to facilitate information gathering and feedback related to use of the piece of equipment. In at least one embodiment, at least one intelligent element within or related to a piece of equipment can interact with at least one other component (e.g., pedometer, GPS, gyroscope, accelerometer) in or related to other equipment, or elsewhere associated with the user.

In at least one embodiment, various algorithms can be used to improve the information collected by sensors. For example, a camera (or components interacting therewith) can include or employ auto-stabilization and/or leveling techniques to ensure the quality of images collected. In one embodiment, an audio recording system (or components interacting therewith) can include various filters or processing steps designed to reduce noise or increase the gain of frequencies at which the sound sought to be recorded exists.

Figure 7:
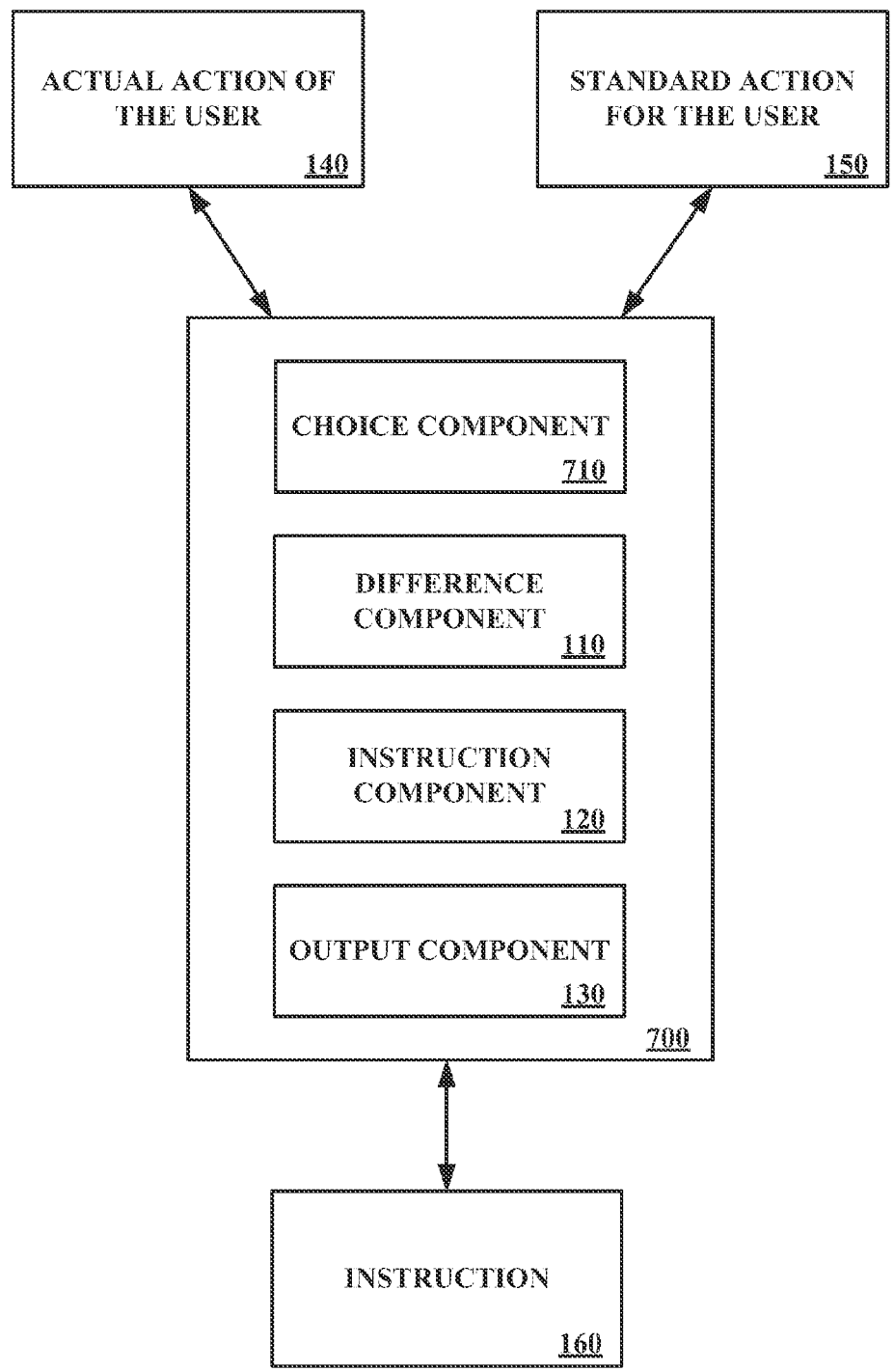
FIG. 7 illustrates at least one embodiment of a system that includes a choice component, the difference component, the instruction component, and the output component.

FIG. 7 illustrates at least one embodiment of a system 700 that includes a choice component 710, the difference component 110, the instruction component 120, and the output component 130. The choice component 710 resolves (e.g., proactively resolves) the standard action for the user 150 from a first standard action and a second standard action. The first standard action and the second standard action can be different standard actions.

In one example, the actual action of the user 140 can be a baseball swing (e.g., swinging of a baseball bat) of the user and a goal of the user can be to have an improved baseball swing. The user may not care in what manner their swing improves, just that their swing does improve. Improvements can be, for example, changes that are statistically likely to raise or lower a metric in a desirable manner. In such an example that involves a baseball swing, similarities can be drawn to discover the technique and/or actions employed by batters who have such desirable metrics (e.g., batting average, strikeouts, slugging percentage, home runs, average speed of hit balls, swinging strikes per at-bat, and others).

Different professional baseball players can have vastly different baseball swings. For example, a first baseball player can use a rotational baseball swing while a second baseball player can use a linear baseball swing. Moving the swing of the user to a more productive rotational motion can meet the goal of an improved swing while moving the swing of the user to a more productive linear motion can also meet the goal. Therefore, the choice component 710 can decide if the standard action for the user 150 should be a rotational swing or a linear swing.

In at least one embodiment, multiple standard actions can be identified. For example, a player can be taught to employ both a rotational and linear swing depending on the situation. In another example, two different linear swings can be identified depending on the pitcher's dominant hand.

Different factors can be taken into account when the choice component 710 chooses the standard action for the user 150. In returning to the baseball example, if the actual action of the user 140 is already closer to the linear swing than the rotational swing, then the choice component 710 can determine it would be most efficient if the linear swing was set for the standard action of the user 150. Therefore, the linear swing can be chosen by the choice component.

In one example, the user can desire for not just an improved swing, but an improved swing with specific attribute such as a swing with more power. The rotational swing can be considered more powerful than the linear swing, whereas the linear swing can be considered more of a contact swing. Based on this information, the choice component 710 can choose the rotational swing since it is likely to provide the specific attribute desired.

In one example, various physical attributes of the user can be taken into account by the choice component 710 in choosing the standard action for the user 150. The user can have longer arms than an average baseball player and these longer arms can influence a likelihood of success for a particular swing. In baseball, a limited amount of time is available for reaction to a pitch on if a hitter will take a swing at the pitch. The longer time a swing takes, the less reaction time is available. If the rotational swing is considered a longer swing than the linear swing and if the user has longer than average arms, then use of the rotational swing by the user may leave too little time for reaction. Therefore, the choice component 710 can choose the linear swing.

In one example, the choice component 710 can take into account physical health of the user. Different nuances of a baseball swing can cause different results on the movement of the user's body and as such put different stresses and strains on muscles, bones, joints, et cetera. In this example, the user can be an accomplished, yet aging professional baseball player. The actual action of the user 140 can be a linear swing with specific characteristics (e.g., location of the right elbow in relation to the torso during the swing, starting point of the swing from the user's batting stance, et cetera). Due to the player aging, physical reaction times may be slowed and/or the player may be more prone to injury. Therefore, the choice component 710 can choose the standard action for the user 150 to be the linear swing, but with characteristic changes to give more time for reaction time, lessen the likelihood of injury, avoid aggravation of existing or previous injuries, et cetera. Based on the selection of the standard action for the user 150 chosen by the choice component 710, the difference component 110 can have something to compare the actual action of the user 140 against and thus identifies the difference used by the instruction component 120 to produce the instruction 160.

Figure 8:
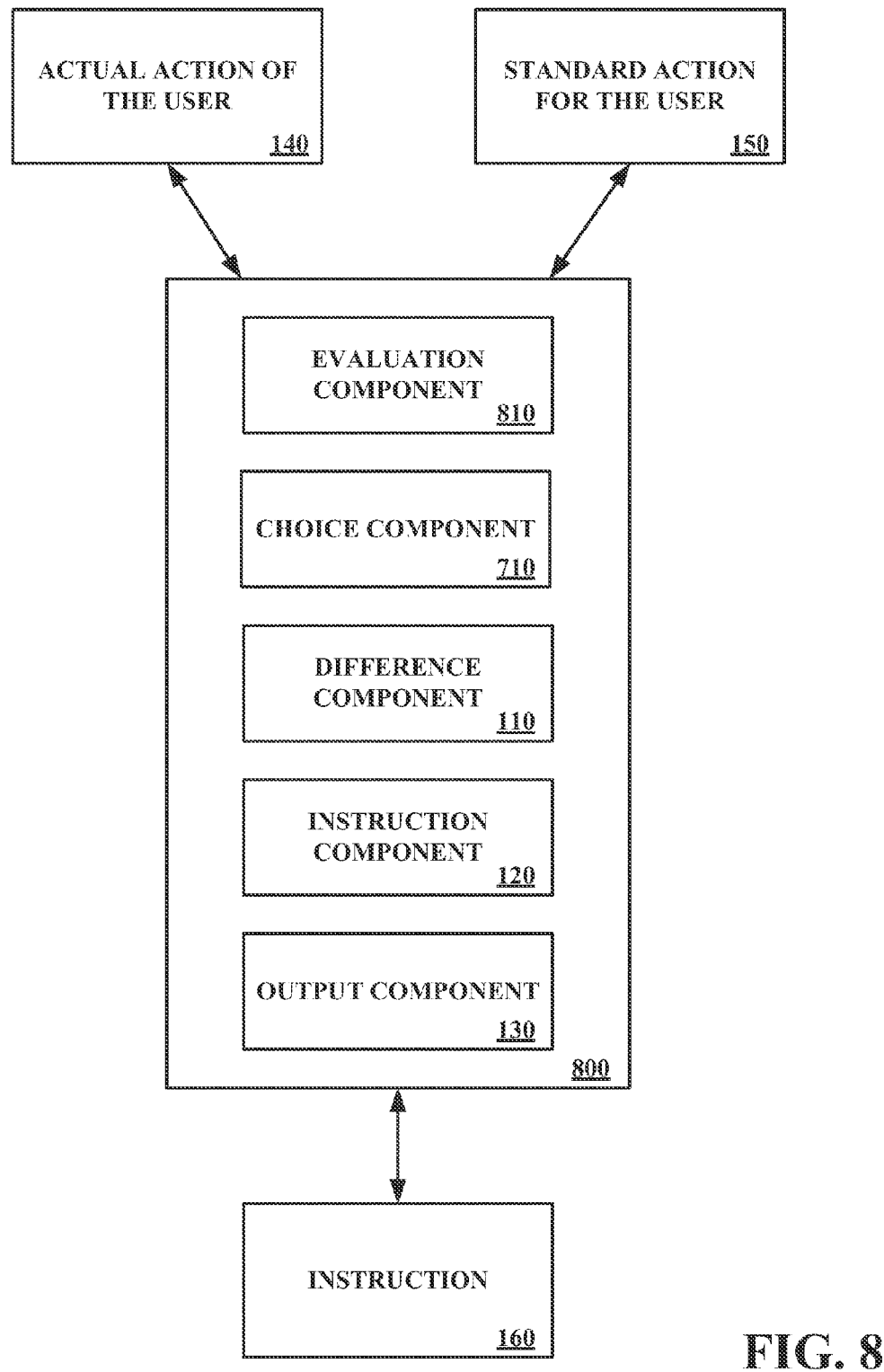
FIG. 8 illustrates at least one embodiment of a system that includes an evaluation component, the choice component, the difference component, the instruction component, and the output component.

FIG. 8 illustrates at least one embodiment of a system 800 that includes an evaluation component 810, the choice component 710, the difference component 110, the instruction component 120, and the output component 130. The evaluation component 810 evaluates the actual action of the user 140 to produce an evaluation result. The choice component 710 proactively (e.g., automatically, in response to a request for the instruction 160, et cetera) makes the choice of the standard action for the user 150 based, at least in part, on the evaluation result.

The evaluation component 810 can evaluate how the user performs a specific task that functions as the actual action of the user 140 and this evaluation can produce the evaluation result. The observation component 610 of FIG. 6 can observe how the user swings the club and make a record that is retained in the non-transitory computer-readable medium. The evaluation component 810 can evaluate the record to determine characteristics of the record to produce the evaluation result. The choice component 710 can access the evaluation result and based on this evaluation result the choice component 710 can perform a search for at least one standard action for the user 150 that can be chosen. If the choice component 710 finds the first standard action for the user and the second standard action for the user, then the evaluation component 810 can evaluate the first standard action for the user and the second standard action for the user and based on this evaluation, along with the evaluation of the actual action of the user, the choice component 710 can choose the standard action for the user 150.

In one example, the user can desire to swing a golf club such that a golf ball travels a certain distance and the user can request that he or she swing a golf club more like Tiger Woods. The evaluation component 810 can evaluate how the user swings the club and based on how the user swings the club the choice component 710 can select a golf swing upon which the user should model his or her golf swing. The choice component 710 can evaluate swings of Tiger Woods at different points of his career and choose a golf swing for the difference component 110 to use as the standard action for the user 150.

As implied above, a plurality of goals can be identified. A user can seek to modify a technique according to two or more factors, such as reflecting the technique of a particular player while maximizing a particular quality separate from the particular player's technique. In at least one embodiment, a user can accept a trade-off in one metric to improve another. In an example, the user can indicate they are willing to accept a possible reduction in the distance of their drives to improve control over direction and/or employ a different club.

The system 800 can function to go against the wishes of the user. Returning to the example in the previous paragraph, the user can request that he or she swing the golf club more like Tiger Woods. The evaluation component 810 can evaluate the actual action of the user 140 and determine that the user's swing is far from that of Tiger Woods, but is relatively close to the swing of Bubba Watson. This can be done by the evaluation component 810 comparing the action of the user 140 against the swings of Tiger Woods, Bubba Watson, as well as other professional and/or notable (e.g., Bobby Jones) golfers. Statistical analysis based on distances, angles, performance metrics, et cetera, can be used to determine a difference measure (or plurality of difference measures in a difference index). A technique with a minimum difference can be preferred, and techniques with larger differences can be rejected or associated with a warning. In at least one embodiment, statistical techniques (e.g., correlation, dependence, et cetera) can be used to determine similar or different techniques.

The choice component 710 can determine that the user may have more success emulating the swing of Bubba Watson than Tiger Woods. In at least one embodiment, the choice component 710 can suggest to the user (e.g., through a user interface) that the user use the swing of Bubba Watson as the standard action for the user 150. If the user rejects the suggestion, then the swing of Tiger Woods can be chosen as the standard action for the user 150. If the user accepts the suggestion, then the swing of Bubba Watson can be chosen as the standard action for the user 150. The choice component 710 can also forgo asking the user and choose the swing of Bubba Watson for the standard action for the user 150 despite the request of the user to have a swing similar to that of Tiger Woods. The instruction component 120 can therefore produce the instruction 160 such that it is consistent with facilitating the user's golf swing to be more like that of Bubba Watson.

Figure 9:
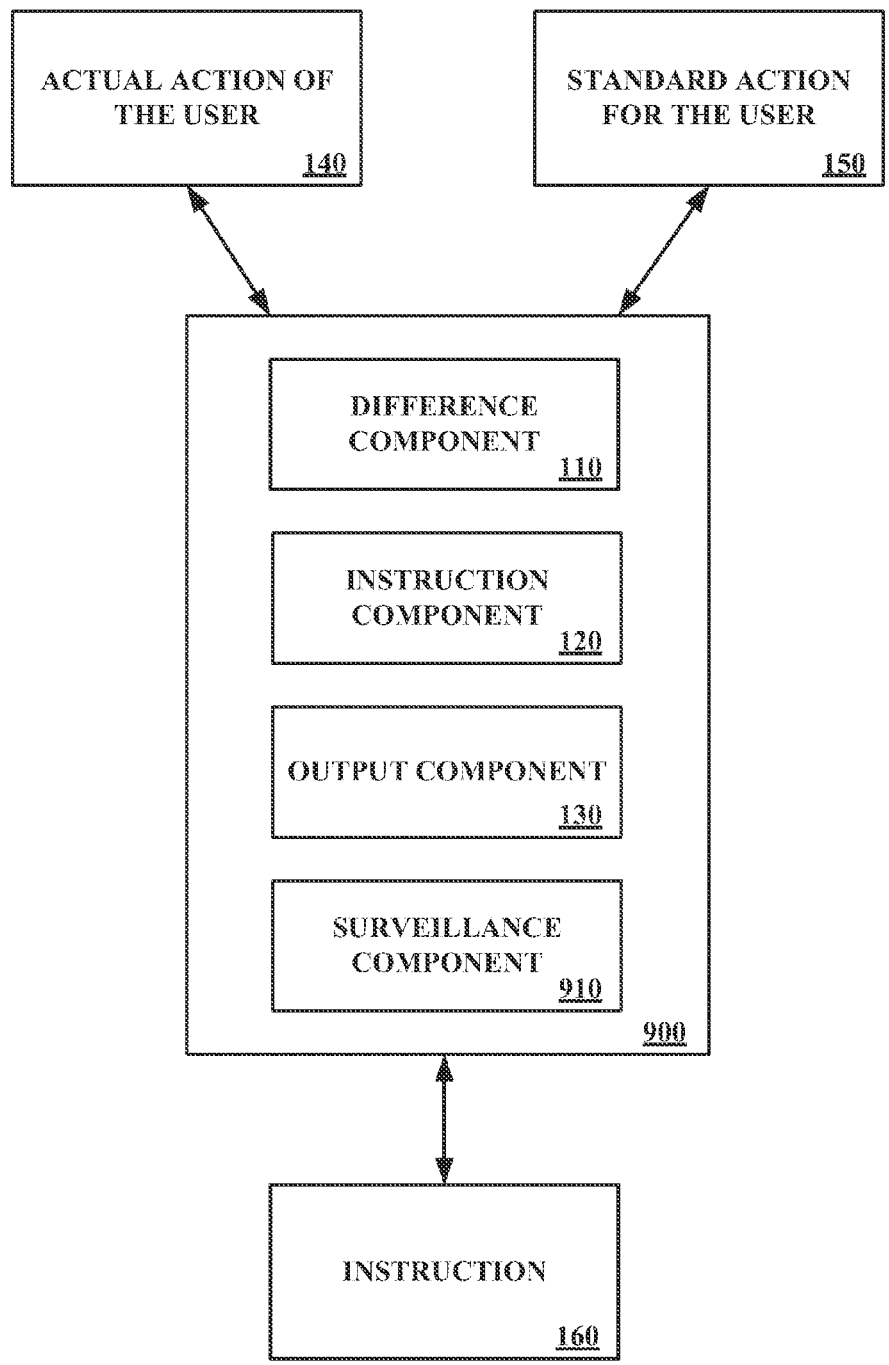
FIG. 9 illustrates at least one embodiment of a system that includes the difference component, the instruction component, the output component, and a surveillance component

FIG. 9 illustrates at least one embodiment of a system 900 that includes the difference component 110, the instruction component 120, the output component 130, and a surveillance component 910. The surveillance component 910 makes a surveillance related to how the user follows the instruction 160. The instruction component 120 is configured to produce a subsequent instruction, where the subsequent instruction instructs the user to change to the standard action for the user 150.

In some instances, a user switching from the actual action of the user 140 to the standard action for the user 150 can be a relatively simple transition for the user. However, the transition can also be quite complex and difficult for the user. Therefore, the instruction 160 can be a first instruction and after the user modifies the actual action of the user 140 to a certain extent the instruction component 120 can produce a subsequent instruction. In this, the difference component 110 can compare an updated version of the actual user action 140 and compare it against the standard action for the user 150. This difference can be used by the instruction component 120 to produce the subsequent instruction and the output component 130 can cause disclosure of the subsequent instruction.

In at least one embodiment, the system 900 can produce the instruction 160 that is intended to be the first instruction in an instruction set. In one example, a baseball pitcher changing his or her throwing motion can be a complex and intricate series of measureable changes. The instruction 160 can be for the pitcher to make a change to a certain part of his or her throwing motion. One or more next instructions provided can be based on how, quantitatively or qualitatively, the change impacts other aspects of the pitcher's throwing motion. Therefore, the difference component 110 can determine a difference between the changed actual action of the user and based on that the instruction component 120 can produce the subsequent instruction.

In at least one embodiment, the difference component 110 can determine that after following the instruction 160 the actual action of the user 140 and the standard action for the user 150 are identical and/or the difference is inconsequential. As such, the difference can be considered none or virtually none and based on this the instruction component 120 can instruct the output component 130 to send a complete message and/or the instruction component 120 does not produce the subsequent instruction. In an example, a player can have a difference in the technique of delivering a motion, but yield the same speed, accuracy, precision, et cetera. In such examples, while differences exist, the end result is the same, and at least one difference among a plurality of differences can be null. In this regard, differences among a plurality of differences can be weighted or prioritized in order to avoid wasted effort on changes that harm a desired outcome or do not improve at least one parameter. In one example with a baseball swing, changing a first difference can substantially increase power while slightly lowering contact with the ball while changing a second difference can cause substantially higher contact with the ball, but slightly decrease power. A youth baseball player can attempt to change his swing because the player is not making very much contact with the ball and oftentimes is striking out in games. While the first difference can benefit the player, the lower contact impact of the change can cause the player to make even less contact can cause the player to become more frustrated, become subject of ridicule of teammates, et cetera and this may cause the player to quit the game. Therefore, the second difference can be prioritized since that will increase contact and cause the player to likely enjoy the game more. Further, due to the already low contact with the ball, the player may be unlikely to notice the decrease in power. Therefore, a first instruction can promote change according to the second difference. Once the player follows the first instruction and improves his swing, a second instruction can be used to promote change according to the first difference. Thus, the outcome can have the player improve his swing with as positive of a process as possible.

In at least one embodiment, the instruction 160 can be an instruction set that includes a first instruction and a second instruction. The user can attempt to follow the first instruction, but the user following the first instruction may not be as expected as determined by the difference component 110. In view of this, the instruction component 120 can alter the second instruction (e.g., before or after being caused to be disclosed by the output component 130) and the altered second instruction can be caused to be disclosed by the output component 130.

In at least one embodiment, the subsequent instruction can be a replacement for the instruction 160. In one example, the user can attempt to follow the instruction, but fail in execution of the instruction. In this example, the instruction 160 can be to have the user bend his or her back forward d degrees, but the user is limited in bending his or her back forward d−5 degrees. The surveillance component 910 can identify the user's difficulty in following the instruction and send a notice to the difference component 110 and/or the instruction component 120. The difference component 110 can determine the difference in view of the user's limitation and/or the instruction component 120 can produce the subsequent instruction in view of the user's limitation. The output component 130 can cause the subsequent instruction to be disclosed.

Figure 10:
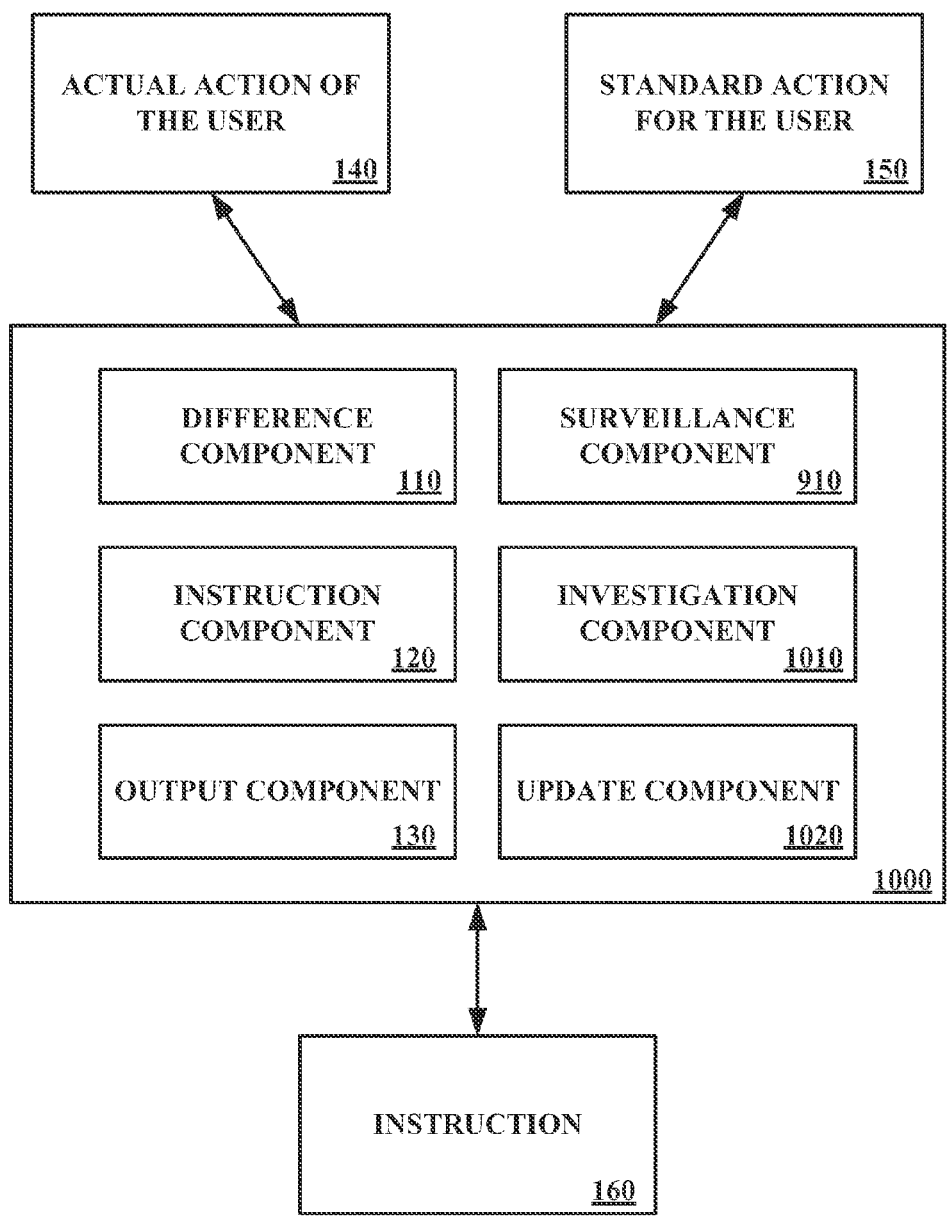
FIG. 10 illustrates at least one embodiment of a system that includes the difference component, the instruction component, the output component, the surveillance component, an investigation component, and an update component.

FIG. 10 illustrates at least one embodiment of a system 1000 that includes the difference component 110, the instruction component 120, the output component 130, the surveillance component 910, an investigation component 1010, and an update component 1020. The investigation component 1010 makes an investigation related to how the user follows the instruction. The update component 1020 updates a logic (e.g., artificial intelligence logic) used by the instruction component 120 for use in production of a subsequent instruction, where the update is based, at least in part, on the surveillance.

In at least one embodiment, the instruction 160 and the subsequent instruction are not for the same actual action of the user 140 and/or not for the same standard action for the user 150. The investigation component 1010 can determine that the user responds well to audio-video instruction and responded poorly to video instruction without audio. The investigation component 1010 can use, for example, statistical analysis techniques over databases, spreadsheets, or other quantified records of movement allowing comparison of instruction 160 and the actual action of the user 140. In at least one embodiment, computer vision, machine learning, and/or artificial intelligence can employ an image-only technique that compares and/or overlays two or more images to compare, for example, instruction 160 and actual action 140. The update component 1020 can update the instruction component 120 such that the instruction component 120 produces subsequent audio-video instructions for the user. Therefore, the update component 1020 can update the logic of the instruction component 120 such that the instruction component 120 is better tailored to a specific user.

Tailoring can include, for example, configuring the instruction component 120 to provide information in a manner for which statistical support exists to indicate the user will closer reflect the desired outcome faster or more accurately. In at least one embodiment, a user can learn at different rates depending on medium or technique of instruction, and the user can select instruction to reflect a particular desire as to learning rate. For example, the user may learn fastest by technique A, reflecting a first accuracy and first precision range of movements with 2 hours of instruction. Continuing in the same example, the user may learn more accurately by technique B, a second, higher accuracy and a second, higher precision in 8 hours. Depending on the user's wishes with regard to speed of training (e.g., bowling tournament tomorrow versus in one month), a particular technique could be manually or automatically selected. For example, if technique B has a greater accuracy outcome than technique A and the user's schedule indicates that there is time to learn technique B, then a component can proactively select technique B for the user.

In at least one embodiment, tailoring can occur during a set-up phase or throughout use of one or more systems and methods herein. For example, a user can indicate time frames, events, and so forth to allow a system to prefer one type of instruction to another. For example, a new fly fisherman may not know what is required to cast or how long it will take to learn, but is aware he will be fly fishing with his boss in two months. Systems and methods herein can infer (e.g., using inferential statistics that are predetermined or developed through previous observation and/or analysis of the user) various instructions and milestones to best prepare the user for the trip in two months. This inferred training plan can thereafter be adjusted during the two months to accommodate the user's unique learning curve, adherence to a schedule of instruction and/or any given instruction, changes to the timeline (e.g., changed timing of trip), et cetera.

The update component 1020 can also update the logic of the instruction component 120 such that the instruction component 120 is more tailored to a small group of users (e.g., golfers of the same gender, birth year, golf handicap, swing nuances, et cetera).

In one example, with the instruction 160 the actual action of the user 140 can be for a golf swing and the standard action for the user 150 can the golf swing of Tiger Woods. The instruction can be for the user to increase the angle of their backswing, but the user can have difficulty with this due to lack of back flexibility. The investigation component 1010 can identify this difficulty and the update component 1020 can, in response to the identification of this difficulty, cause the logic of the instruction component 120 to consider limited back flexibility in subsequent instructions. At another time, the actual action of the user 140 can be a tennis backhand and the standard action for the user can be a generic backswing with a result of more accuracy. When the instruction component 120 produces the instruction 160 with regard to the tennis backhand, the updated logic with cause the instruction to put less emphasis on back flexibility than would have been without the update.

In at least one embodiment, at least one component disclosed herein (e.g., the instruction component 120, the choice component 710 of FIG. 7, et cetera) is located at a central server that communicates with different client devices (e.g., mobile devices). The different client devices can access the instruction component 120 and request the instruction 160. As feedback is gained from users at these different client devices following various instructions, the update component 1020 can update the logic of the instruction component 120 such that the instruction component produces improved instructions. In at least one embodiment, the update component 1020 is located at the central server while different client devices have individual instruction components 120. In one example, the update component 1020 can determine a global update and push the update to the instruction components 120 at the different client devices. In one example, the update component 1020 can determine an update for an individual instruction component 120 or a subset of instruction components 120 (e.g., less than a full set of instruction components serviced by the update component 1020) and this update can be pushed to the appropriate instruction component 120 or subset of instruction component 120.

Figure 11:
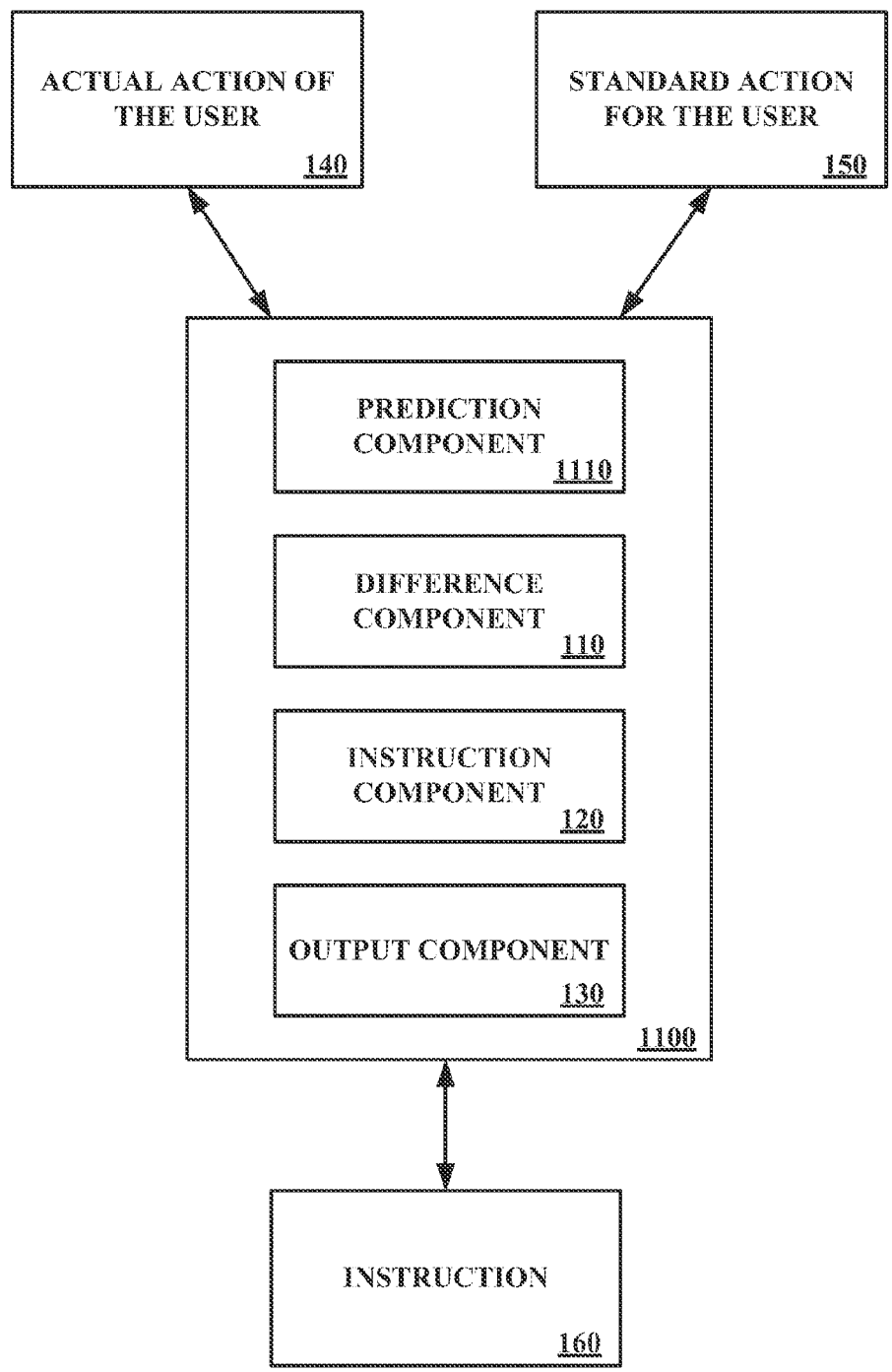
FIG. 11 illustrates at least one embodiment of a system that includes a prediction component, the difference component, the instruction component, and the output component.

FIG. 11 illustrates at least one embodiment of a system 1100 that includes a prediction component 1110, the difference component 110, the instruction component 120, and the output component 130. The prediction component 1110 predicts a future actual action of the user. The instruction component 120 takes the future actual action of user into account in the production of the instruction 160.

In at least one embodiment, an anticipation of deterioration of the user's body with age can be taken into account. The actual action of the user 140 can be long-distance running, such as running in a 10 kilometer race (a 10 k). In one example, the user can be near retirement age. The prediction component 1110 can predict that in the future the user will have less flexibility when they run as they age. The instruction component 120 can produce the instruction 160 such that a stride learned currently will also work in the future as the user has less flexibility. In one example, the user can be a teenager. A medical professional may believe it is detrimental for a teenager, specifically a younger teenager, to run a race as long as a 10 k. The instruction 160 can be for the teenager not to run the race (e.g., the instruction component 120 evaluates the standard action for the user 150 of a world champion runner and determines that the impact on the body of the teenager would be too great). The instruction 160 can be for the teenager to run with minimal or lowered impact on long term health. Thus, the standard action for the user 150 can be a healthy or relatively healthy running style for the teenager.

In at least one embodiment, an anticipation of deterioration of the user's body over an activity is taken into account. In one example, the actual action of the user 140 is the user's stride while running the first miles in a marathon. As the user runs, various instructions can be provided to the user (e.g., the instruction 160). The initial instructions can take into account that the user has many miles ahead. Therefore, the instructions can be for movements that conserve energy of the user since the future actual action of the user will be continued running.

In at least one embodiment, the prediction component 1110 can anticipate that as a runner runs in a marathon, lactic acid will build in his or her legs and as such it will be more difficult for the user to move their legs. Therefore, the instruction component 1110 can produce the instruction 160 such that lower lactic acid levels are achieved as the user runs. In at least one embodiment, the prediction component 1110 can view a user medical history and determine that later in races the user has knee pain from continued impact on pavement. The instruction component 160 can produce the instruction 160 such that a movement is selected to cause knee pain to be lowered. In at least one embodiment, the prediction component 1110 can anticipate that the user will lose certain form elements in their running stride as the user runs more miles of the marathon. Therefore, the instruction 160 can be produced in anticipation of this loss of form and/or to have the loss of form occur at a latest time possible. In at least one embodiment, the system 110 can be incorporated in a device that includes a map application (e.g., map website, map database, et cetera) and a global positioning system. The instruction 160 can be different if it is anticipated that the running will run mostly uphill as opposed to mostly downhill (which can be determined by way of the map application and the global positioning system).

In at least one embodiment, an anticipation of how the user will improve is taken into account. The actual action of the user 140 can be a golf swing and the standard action for the user can be the golf swing of Tiger Woods. While the overall goal can be for the user to emulate the swing of Tiger Woods, the growing process to reach that goal can be difficult and frustrating. The prediction component 1110 can predict that the user will not have success for the first q number of months after following a first instruction when swing transition includes multiple instructions. The prediction component 1110 can also predict that the user has a certain likelihood of becoming tired of not being successful. Based on this information, the instruction component 120 can produce the instruction 160 (e.g., select a particular instruction over at least one other possible instruction) to minimize initial change for the actual action of the user 140 (e.g., even if this adds to an overall number of instructions of lengthens time for the user to reach the standard action for the user 150), attempt to have the actual user such that the user's golf score stays as low as possible, et cetera The instruction component 120 can retain the instruction in a non-transitory computer-readable medium and the output component 130 can cause the instruction to be disclosed (e.g., texted to a mobile device associated with the user).

In at least one embodiment, medical databases or purpose-built databases can be leveraged to determine ages or conditions at/under which injury, deterioration, rate of healing, and other physical risks manifest or subside. Based on user information (e.g., age, height, weight, previous injuries or conditions, and others), training plans can be customized to minimize risks or facilitate recovery based on a user's place in a risk database generated from at least the medical or purpose-built databases. The user's seeding in the risk database can change based on observed performance and over time (e.g., as a user ages, their placement in the database can change) or events (e.g., if the user suffers an injury, then their placement in the database can change). In at least one embodiment, the user can report a condition or injury, and a training plan can be adjusted in turn. In at least one embodiment, at least one of a user's body composition or an estimated body composition can be used to estimate forces and stresses applied to particular portions of a body (e.g., knee joints). Training can be customized to select motions or activities that minimize use or wear to particular portions of the body based on injury or estimated risk. In addition, user injury risk can be balanced against other goals. For example, a professional athlete may desire to shorten a recovery schedule even if that means a risk of re-injury is greater due to a limited window in which the professional athlete can make money. In addition, observed following of training and other learned information can populate the database, change how training (e.g., training instructions) is produced, et cetera.

Figure 12:
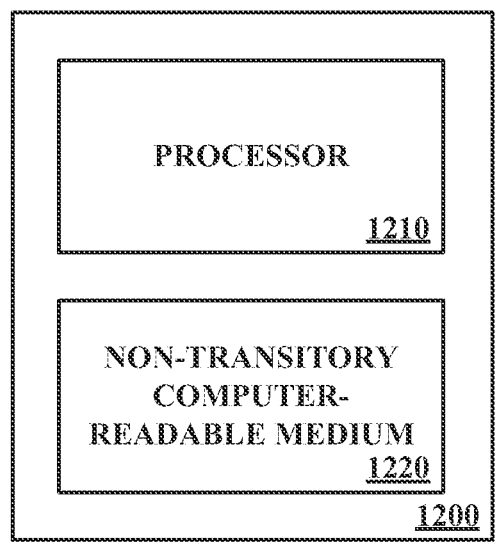
FIG. 12 illustrates at least one embodiment of a system that includes a processor and a non-transitory computer-readable medium.

FIG. 12 illustrates at least one embodiment of a system 1200 that includes a processor 1210 and a non-transitory computer-readable medium 1220. In at least one embodiment, the processor 1210 and/or the non-transitory computer-readable medium 1220 can individually be part of various systems disclosed herein. For example, the non-transitory computer-readable medium 1220 can be part of the system 100 of FIG. 1 (e.g., with or without the processor 1210) and can retain the instruction 160 of FIG. 1. In at least one embodiment, the processor 1210, the non-transitory computer-readable medium 1220, and/or another component disclosed herein can be part of the mobile device discussed with regard to FIG. 1. In at least one embodiment, a component disclosed herein can include the processor 1210 and/or the processor 1210 can function as a component disclosed herein (e.g., preform processing of the observation component 610 of FIG. 6).

In at least one embodiment, the non-transitory computer-readable storage medium 1220 is communicatively coupled to the processor 1210 and stores computer executable components to facilitate operation of the components comprising a variance component, a recommendation component, and a causation component. The variance component is configured to identify a variance between an item and a desired outcome for the item. The recommendation component is configured to make a recommendation on how to change the item to be more in line with the desired outcome for the item, where the recommendation is based, at least in part, on the variance. The causation component is configured to cause revelation of the recommendation (e.g., display on a monitor, cause audio presentment, et cetera).

In one example, a writer can write several chapters of a book and be struck with writer's block on how to continue with the book and thus have a partially completed book. The variance component can analyze the partially completed book to determine a book style, book genre, and other information. Based on this information, the variance component can search out completed books (or a single completed book) similar to the chapters, where the sought out books are commercially successful, critically acclaimed, et cetera. Such aspects can be determined using various statistical analyses or searching techniques. In at least one embodiment, books (or other media) can be analyzed and assigned a "fingerprint" based on an analysis algorithm, from which similarities or distinctions can be gleaned. In at least one embodiment, media can be manually rated or associated with particular qualities. Hybrid techniques utilizing machine learning or other techniques can be employed to develop stored information against which to analyze the writer's style or develop suggestions. The variance component can compare the found book or books with the partially completed book and based on this comparison the recommendation component can recommend how the writer should move forward with the partially completed book. For example, the recommendation can be to have the love interests marry if the writer's block is at the point on if they should move forward together or drift apart.

In one example, an advertisement can be evaluated to determine a similarity of the advertisement to other advertisements, where the desired outcome is that the advertisement has a positive impact on potential consumers. If the advertisement is too similar to advertisements of competitors, then the advertisement may not have the positive impact desired. The recommendation component can proactively determine how the advertisement should be changed to make the advertisement more distinct while having the positive impact. The causation component can proactively cause the recommendation to be revealed (e.g., generate a report that includes the recommendation). In at least one embodiment, the causation component can proactively cause the recommendation to be implemented upon the advertisement.

In one example, an artist can produce a painting that he or she believes is complete. The artist can submit a sample painting that the artist would like his or her painting to be similar to as the desired outcome. The variance component can compare the painting with the sample painting to determine differences (or single difference) between the painting and the sample painting. The recommendation component can recommend how the painting could be changed to be more similar to the sample painting or recommend that the painting is similar enough to the sample painting and as such the recommendation is that no change should be made. The causation component can disclose this recommendation.

In one example, a musical artist can write a song and have specific metrics for the song such as length, vocal range for the singer, et cetera. The variance component can compare the song (e.g., a performance of the song, sheet music of the song) against the specific metrics that function as the desired outcome. The recommendation component can identify how the change the song and recommend the identified changes. The causation component can disclose the identified changes by modifying the song and playing the modified song for the musical artist. The musical artist can use an interface to accept the changes, accepts part of the changes, make further changes, reject the changes, et cetera.

In one example, a student can try to solve a mathematical problem on a chalkboard that is the item. The observation component 610 of FIG. 6 can identify that that student is performing a step wrong that is the actual action of the user 140 as compared to a correct solution that is the desired outcome for the item. The variance component can compare the step against the correct solution and the recommendation component can make a recommendation to the student on how the correct the wrong step. This recommendation can include telling the student the correct step, informing the student that the step is wrong, playing a lesson for the student, et cetera. The causation component can reveal the recommendation.

While particular examples have been provided, it is to be appreciated that instances directed to sports, art, or other tasks are provided to suggest the spirit of aspects herein rather than provide a literal or exhaustive listing. One of ordinary skill in the art will appreciate how examples directed to a writer can be modified to apply to an athlete, how examples directed to an athlete can be modified to apply to a musician, and so forth.

The following methodologies are described with reference to figures depicting the methodologies as a series of blocks. These methodologies may be referred to as methods, processes, and others. While shown as a series of blocks, it is to be appreciated that the blocks can occur in different orders and/or concurrently with other blocks. Additionally, blocks may not be required to perform a methodology. For example, if an example methodology shows blocks 1, 2, 3, and 4, it may be possible for the methodology to function with blocks 1-2-4, 1-2, 3-1-4, 2, 1-2-3-4, and others. Blocks may be wholly omitted, re-ordered, repeated or appear in combinations not depicted. Individual blocks or groups of blocks may additionally be combined or separated into multiple components. Furthermore, additional and/or alternative methodologies can employ additional, not illustrated blocks, or supplemental blocks not pictured can be employed in some models or diagrams without deviating from the spirit of the features. In addition, at least a portion of the methodologies described herein may be practiced on a computer-readable medium storing computer-executable instructions that when executed by a processor cause the processor to perform a methodology (e.g., method).

Figure 13:
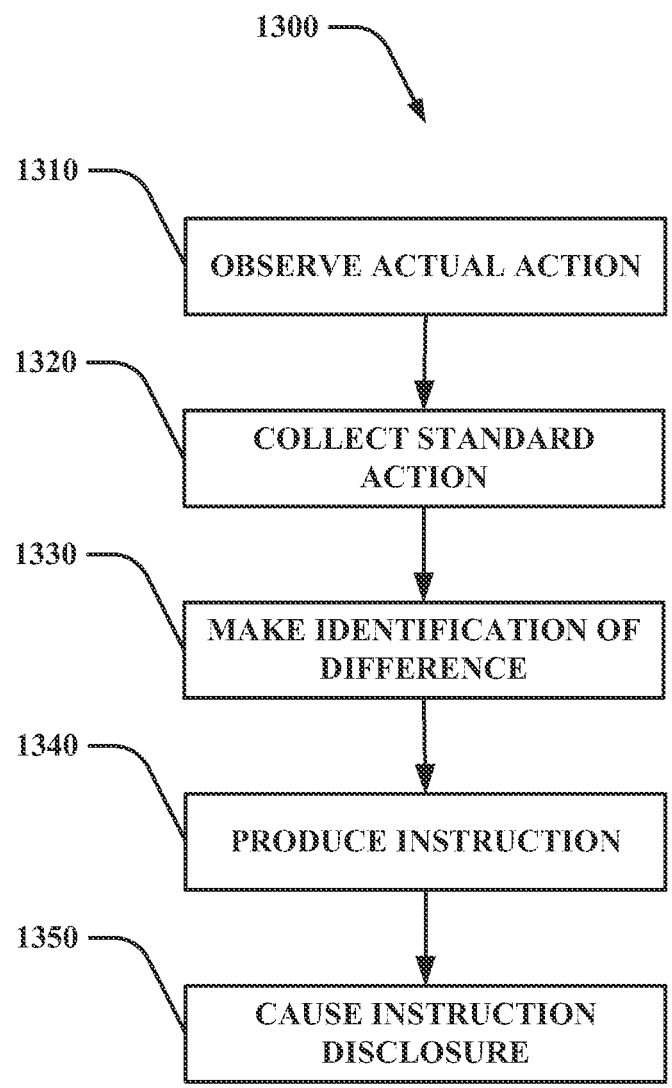
FIG. 13 illustrates at least one embodiment of a first method.

FIG. 13 illustrates at least one embodiment of a first method 1300. At 1310, observing an actual action of a user occurs and at 1320, collecting a standard action for the user occurs. At 1330, making an identification of a difference between the actual action of the user and the standard action for the user occurs. Producing an instruction for the user to instruct the user to change from the action of the user to the standard action for the user occurs at 1340, where the production of the instruction is based, at least in part, on the difference. At 1350, causing disclosure of the instruction occurs. Actions are not necessarily required to be performed in the order listed. For example, the standard action can be collected before the actual action is observed.

Figure 14:
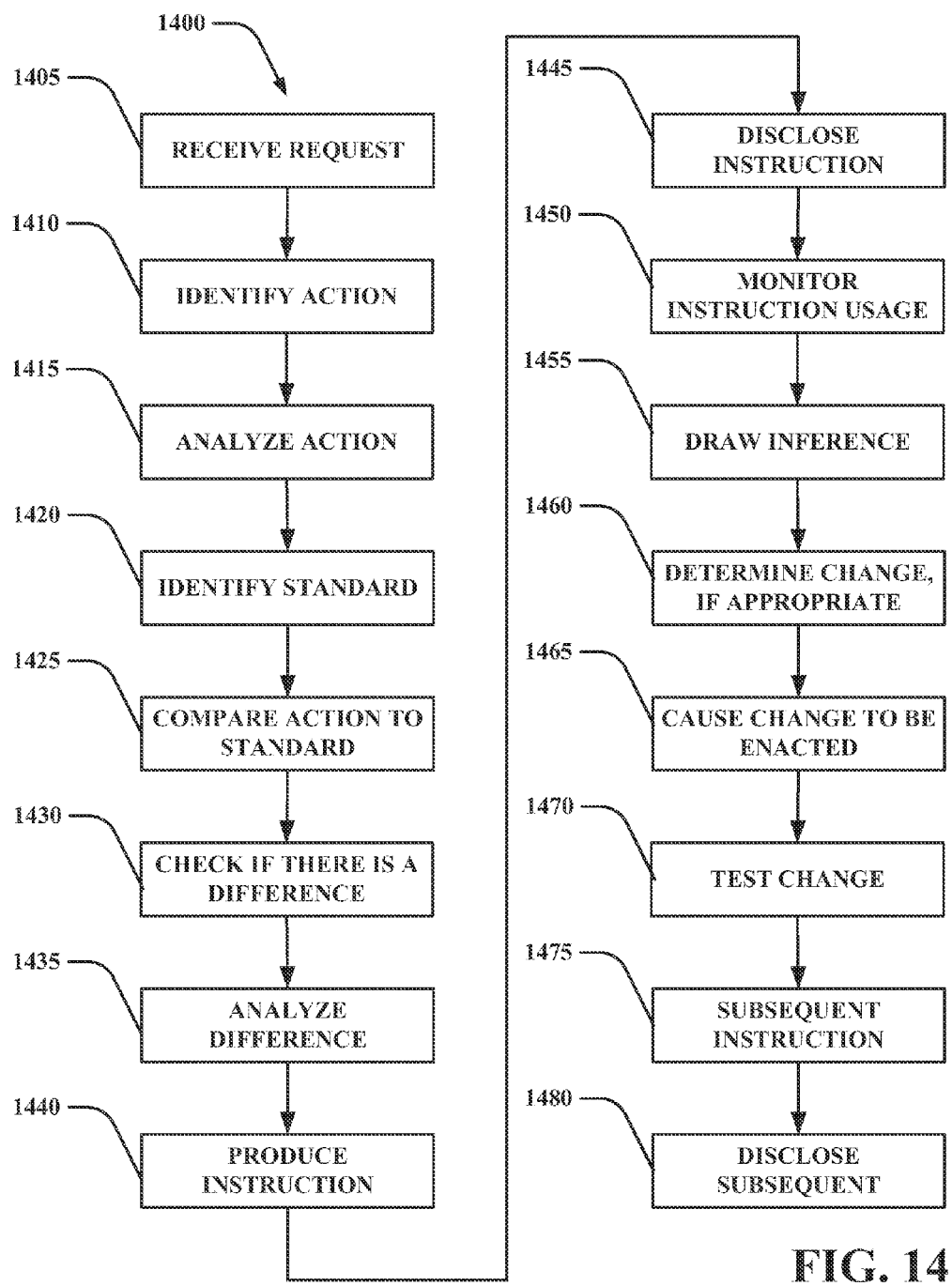
FIG. 14 illustrates at least one embodiment of a second method.

FIG. 14 illustrates at least one embodiment of a second method 1400. At 1405, a request is received (e.g., from the user, from a coach or instructor, from an automated system, et cetera) for an instruction and the action to receive the instruction is identified at 1410. The action is analyzed at 1415 and a standard for the action is identified at 1420. The standard can be expressly given, found, found and then verified (e.g., by the user as acceptable), et cetera. The action and standard can be compared to one another at 1425 and a check can occur if a difference exists at 1430. If the difference does not exist or is not considered substantial (e.g., objective metric and/or subjective metric), then a notice can be given that no change in action should occur.

If the difference does exist or is substantial, then the difference can be analyzed at 1435 and an instruction can be produced at 1440 based, at least in part, on analysis of the difference. The instruction can also be produced (e.g., generated, found, selected, et cetera) based on the action, the standard, a user request, user biometric data, or other data that may or may not include the difference. The instruction can be disclosed at 1445 and how the user follows the instruction can be monitored at 1450. An inference can be drawn on how the user follows the instruction (e.g., the user ignores the instruction, the user has great success in following the instruction, et cetera). Based on this inference, a determination can be made on if logic should be changed at 1455 used to produce the instruction. If the determination is that the logic should not be changed, a result of the inference and/or a monitor result can be recorded and used at a later time if further evidence arises.

If change is appropriate, the change can be determined at 1460 and enacted at 1465, the logic with the change can be tested at 1470, a subsequent instruction can be produced at 1475, and the subsequent instruction can be disclosed at 1480.

Figure 15:
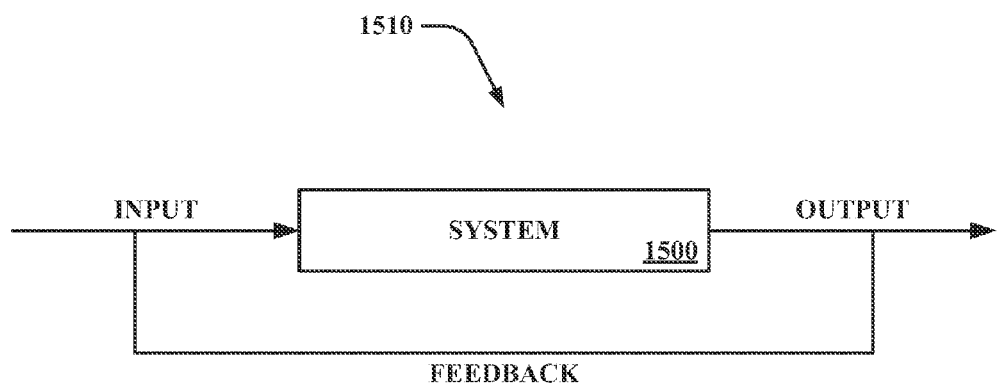
FIG. 15 illustrates at least one embodiment of an example system that can function as part of a control system.

FIG. 15 illustrates at least one embodiment of an example system 1500 that can function as part of a control system 1510. The system 1500 can include at least one component disclosed herein and the control system 1510 can be a mechanical control system, electrical control system, analog control system, digital control system, software control system, et cetera. The input can be commands (e.g., computer source code, computer executable code, et cetera) used by the instruction component 120 of FIG. 1 to produce the instruction of FIG. 1 while the instruction 160 of FIG. 1 and how the user follows this instruction can be the output. Based, at least in part, on how the user follows the instruction 160 of FIG. 1, feedback can be obtained that can be used to change the commands.

Figure 16:
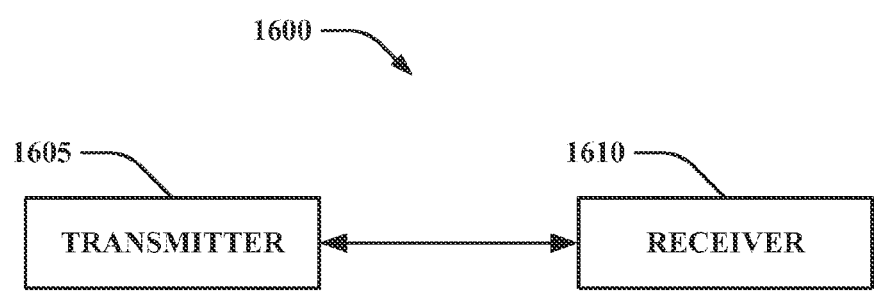
FIG. 16 illustrates at least one embodiment of a system that may be used in practicing at least one aspect disclosed herein.

FIG. 16 illustrates at least one embodiment of a system 1600 that may be used in practicing at least one aspect disclosed herein. The system 1600 includes a transmitter 1605 and a receiver 1610. In one or more embodiments, the transmitter 1605 can include reception capabilities and/or the receiver 1610 can include transmission capabilities. In at least one embodiment, the system 100 of FIG. 1 includes the transmitter 1605 and/or the receiver 1610. In at least one embodiment, the transmitter 1605 functions as at least part of the output component 130 of FIG. 1. In at least one embodiment, the receiver functions as at least part of the input component 510 of FIG. 5 to receive the goal input from a mobile device of the user (e.g., transmitted from the transmitter 1605). In at least one embodiment, the system 100 of FIG. 1 and/or the system 1200 of FIG. 12 integrate with the system 1600 on a mobile device.

The transmitter 1605 and receiver 1610 can each function as a client, a server, and others. The transmitter 1605 and receiver 1610 can each include the non-transitory computer-readable medium 1220 of FIG. 12 used in operation. The non-transitory computer-readable medium 1220 of FIG. 12 may include instructions that are executed by the transmitter 1605 or receiver 1610 to cause the transmitter 1605 or receiver 1610 to perform a method (e.g., a method disclosed herein). The transmitter 1605 and receiver 1610 can engage in a communication with one another. This communication can be over a communication medium. Example communication mediums include an intranet, an extranet, the Internet, a secured communication channel, an unsecure communication channel, radio airwaves, a hardwired channel, a wireless channel, and others. Example transmitters 1605 include a base station, a personal computer, a cellular telephone, a personal digital assistant, and others. Example receivers 1610 include a base station, a cellular telephone, personal computer, personal digital assistant, and others. The example system 1600 may function along a Local Access Network (LAN), Wide Area Network (WAN), and others. The aspects described are merely an example of network structures and intended to generally describe, rather than limit, network and/or remote applications of features described herein.

Figure 17:
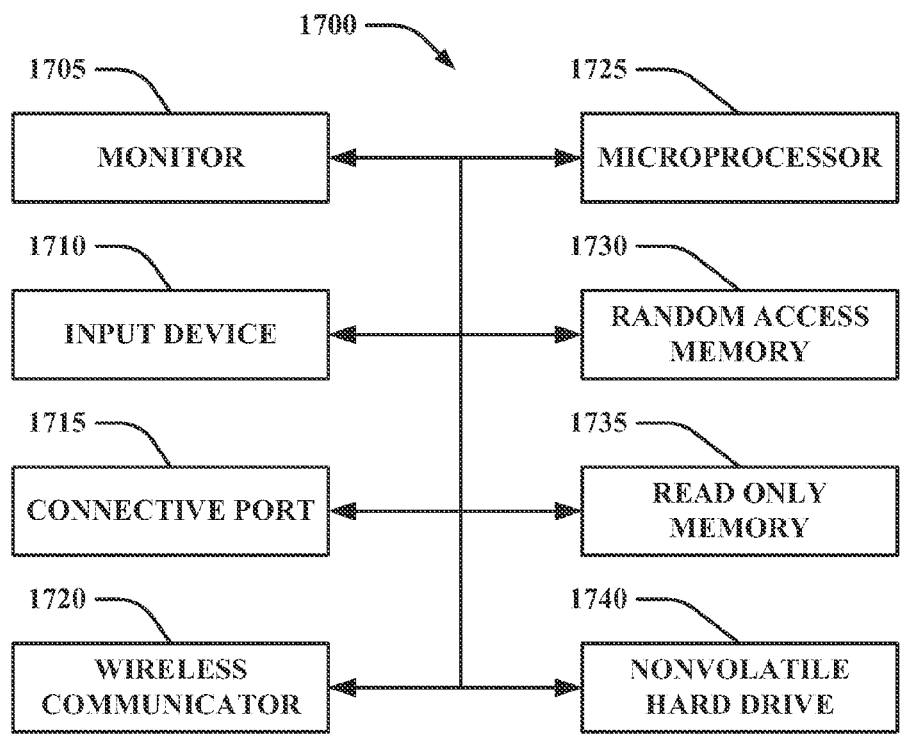
FIG. 17 illustrates at least one embodiment of a system, upon which at least one aspect disclosed herein can be practiced.

FIG. 17 illustrates at least one embodiment of a system 1700, upon which at least one aspect disclosed herein can be practiced. In at least one embodiment, the system 1700 can be considered a computer system that can function in a stand-alone manner as well as communicate with other devices (e.g., a central server, communicate with devices through data network (e.g., Internet) communication, etc). Information (e.g., the instruction 160 of FIG. 1) can be displayed through use of a monitor 1705 and a user can provide information (e.g., goal input, location information for the standard action for the user 150 of FIG. 1, et cetera) through an input device 1710 (e.g., keyboard, mouse, touch screen, et cetera). A connective port 1715 can be used to engage the system 1700 with other entities, such as a universal bus port, telephone line, attachment for external hard drive, and the like. Additionally, a wireless communicator 1720 can be employed (e.g., that uses an antenna) to wirelessly engage the system 1700 with another device (e.g., in a secure manner with encryption, over open airwaves, and others). A microprocessor 1725 (e.g., that functions as the processor 1210 of FIG. 12) can be used to execute applications and instructions that relate to the system 1700. In one example, the microprocessor 1725 executes at least one instruction associated with at least one of the difference component 110 of FIG. 1, the instruction component 120 of FIG. 1, or the output component 130 of FIG. 1. Storage can be used by the system 1700, such as the microprocessor 1725 executing instructions retained by the storage. The storage can be an example of the non-transitory computer-readable medium 1220 of FIG. 12. Example storage includes random access memory 1730, read only memory 1735, or nonvolatile hard drive 1740. In at least one embodiment, a memory (e.g., at least one of the random access memory 1730, read only memory 1735, and/or the nonvolatile hard drive 1740) retains instructions that cause a method disclosed herein to operate. In at least one embodiment, the memory retains a database in accordance with at least one aspect disclosed herein.

The system 1700 may run program modules. Program modules can include routines, programs, components, data structures, logic, et cetera, that perform particular tasks or implement particular abstract data types. The system 1700 can function as a single-processor or multiprocessor computer system, minicomputer, mainframe computer, laptop computer, desktop computer, hand-held computing devices, microprocessor-based or programmable consumer electronics, and the like.

It is to be appreciated that aspects disclosed herein can be practiced through use of artificial intelligence techniques. In one example, a determination or inference described herein can, in at least one embodiment, be made through use of a Bayesian model, Markov model, statistical projection, neural networks, classifiers (e.g., linear, non-linear, et cetera), using provers to analyze logical relationships, rule-based systems, deep intelligence, or other technique.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, innovative aspects are not limited to the specific details, the representative apparatus, and illustrative examples shown and described. Thus, this application is intended to embrace alterations, modifications, and variations that fall within the scope of the appended claims.

Functionality described as being performed by one entity (e.g., component, hardware item, and others) may be performed by other entities, and individual aspects can be performed by a plurality of entities simultaneously or otherwise. For example, functionality may be described as being performed by a processor. One skilled in the art will appreciate that this functionality can be performed by different processor types (e.g., a single-core processor, quad-core processor, et cetera), different processor quantities (e.g., one processor, two processors, et cetera), a processor with other entities (e.g., a processor and storage), a non-processor entity (e.g., mechanical device), and others.

In addition, unless otherwise stated, functionality described as a system may function as part of a method, an apparatus, a method executed by a computer-readable medium, and other embodiments may be implemented. In one example, functionality included in a system may also be part of a method, apparatus, and others.

Where possible, example items may be combined in at least some embodiments. In one example, example items include A, B, C, and others. Thus, possible combinations include A, AB, AC, ABC, AAACCCC, AB, ABCD, and others. Other combinations and permutations are considered in this way, to include a potentially endless number of items or duplicates thereof.

What is claimed is:

1. A system, comprising:
   a component set; and
   a housing, comprising:
      a sensor that, at least partially, captures an actual action of a user, and
      hardware that couples the housing to at least one of the user, equipment used by the user in performance of the actual action of the user, or a combination thereof; and
      communication hardware that communicates the actual action of the user to the component set,
   the component set comprising:
      a comparison component that:
         compares the actual action of the user against a first standard action to produce a first comparison result, and
         compares the actual action of the user against a second standard action to produce a second comparison result;
      a difference component that:
         makes an identification of a deviation between the actual action of the user and the first standard action of the user through use of the first comparison result, and
         makes an identification of a deviation between the actual action of the user and the second standard action of the user through use of the second comparison result;
      a selection component that selects a selected standard action for the user based, at least in part, on a smaller deviation of the deviation between the actual action of the user and the first standard action and the deviation between the actual action of the user and the second standard action;
      an instruction component that produces an instruction to instruct the user to change from the actual action of the user to the selected standard action for the user; and
      a communication component that causes disclosure of the instruction.

2. The system of claim 1, where the instruction is, at least in part, an instruction to use the equipment used by the user in performance of the actual action of the user.

3. The system of claim 1, the component set comprising: a surveillance component that makes a surveillance related to how the user follows the instruction, where the instruction component is configured to produce a subsequent instruction and where the subsequent instruction instructs the user to change to a non-selected standard action for the user.

4. The system of claim 1, the component set comprising:
   an investigation component that makes an investigation related to how the user follows the instruction; and
   an update component that updates a logic used by the instruction component for use in production of a subsequent instruction, where the update is based, at least in part, on a result of the investigation.

5. The system of claim 1, the component set comprising:
   a prediction component that predicts a future actual action of the user, where the instruction component takes the future actual action of the user into account in production of the instruction.

6. The system of claim 5, where the future actual action is non-identical to the selected standard action for the user.

7. The system of claim 1, where the hardware is hardware configured to couple the housing to the user.

8. The system of claim 7, where the instruction is, at least in part, an instruction for body movement absent a piece of equipment.

9. The system of claim 1, where the hardware is hardware configured to couple the housing to equipment used by the user in performance of the actual action of the user.

10. The system of claim 1,
    where the sensor is configured to capture a second actual action of the user,
    where the second actual action of the user is an action where the user follows the instruction, and
    where the component set functions with regard to the second actual action of the user.

11. The system of claim 1, where the housing comprises at least part of the component set.

12. A system comprising hardware communicatively coupled to a sensor and performing a method, the method comprising:
    obtaining a body movement of an actual action of a user from the sensor;
    comparing the body movement of the actual action of the user against a movement of a first standard action for the user to produce a first comparison result;
    making an identification of a difference between the body movement of the actual action of the user and the movement of the first standard action for the user through use of the first comparison result;
    determining a first deviation between the actual action of the user and the first standard action for the user;
    comparing the body movement of the actual action of the user against a movement of a second standard action for the user to produce a second comparison result;
    making an identification of a difference between the body movement of the actual action of the user and the movement of the second standard action for the user through use of the second comparison result;
    determining a second deviation between the actual action of the user and the second standard action for the user;
    identifying a smallest deviation from a deviation set comprising the first deviation and the second deviation; and
    appointing the difference associated with the smallest deviation as an appointed difference,
    where an instruction is produced and outputted to instruct the user in such a manner as to mitigate the appointed difference between the actual action of the user to the respective standard action for the user.

13. The system of claim 12, where the actual action of the user, the first standard action, and the second standard action are directed to achieving a similar outcome to a task.

14. The system of claim 12, the method comprising:
making an observation on an effectiveness level of the instruction by the user; and
making a determination on if a subsequent instruction should be produced based on a result of the observation,
where the subsequent instruction is produced when the determination is that the subsequent instruction should be produced.

15. The system of claim 12, where the instruction is, at least in part, an instruction to use a piece of sports equipment and the sensor is coupled to the piece of sports equipment.

16. A system, comprising:
a sensor configured to, at least partially, capture an actual motion of a user;
hardware, that is physically coupled to the sensor, configured to physically couple the sensor to at least one of the user, equipment used in performance of the actual motion of the user, or a combination thereof; and
communication hardware, that is operatively coupled to the sensor, configured to communicate the actual motion of the user from the sensor to at least part of a component set,
the component set comprising:
a first assessment component configured to contrast an actual motion of the user, that is captured by way of the sensor, against a first standard motion to produce a first contrast result;
a first ascertainment component configured to ascertain a first variance between the actual motion of the user and the first standard motion through use of the first contrast result;
a first conclusion component configured to conclude a first deviation between the actual motion of the user and the first standard motion through use of the first variance;
a second assessment component configured to contrast the actual motion of the user against a second standard motion to produce a second contrast result;
a second ascertainment component configured to ascertain a second variance between the actual motion of the user and the second standard motion through use of the second contrast result;
a second conclusion component configured to conclude a second deviation between the actual motion of the user and the second standard motion through use of the second variance;
a deviation component configured to conclude a desirable deviation from a deviation set comprising the first deviation and the second deviation;
an assignment component configured to assign the deviation associated with the desirable deviation as an assigned deviation;
a production component configured to produce a direction to teach the user in such a manner as to mitigate the assigned deviation between the actual motion of the user to the respective standard motion; and
an output component configured to output the direction.

17. The system of claim 16,
where the equipment used in performance of the actual motion of the user is a piece of sports equipment, and
where the direction is, at least in part, a direction to use the piece of sports equipment.

18. The system of claim 17,
where the coupling hardware is configured to couple the sensor to the piece of sports equipment, and
where a mobile device is configured to retain the component set.

19. The system of claim 16,
where the sensor is configured to capture a second actual motion of the user,
where the second actual motion of the user is a motion in which the user follows the direction, and
where the component set functions with regard to the second actual motion of the user such that the production component is configured to produce a second direction to teach the user in such a manner as to further mitigate the assigned deviation.

20. The system of claim 16, where the deviation component is configured to conclude the desirable deviation as a smallest deviation.

* * * * *